United States Patent
Zhang

(10) Patent No.: US 10,636,025 B2
(45) Date of Patent: Apr. 28, 2020

(54) PAYMENT PROCESSING CONDITIONED ON MULTI-PARTY GEOLOCATION CONSTRAINTS

(71) Applicant: Tencent Technology (Shenzhen) Company Limited, Shenzhen (CN)

(72) Inventor: Yumiao Zhang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 1107 days.

(21) Appl. No.: 14/992,840

(22) Filed: Jan. 11, 2016

(65) Prior Publication Data
US 2016/0125382 A1    May 5, 2016

Related U.S. Application Data

(63) Continuation of application No. PCT/CN2014/085961, filed on Sep. 5, 2014.

(30) Foreign Application Priority Data

Dec. 25, 2013 (CN) .......................... 2013 1 0726480

(51) Int. Cl.
*G06Q 20/40* (2012.01)
*G06Q 20/22* (2012.01)
*G06Q 50/00* (2012.01)

(52) U.S. Cl.
CPC ........... *G06Q 20/223* (2013.01); *G06Q 20/40* (2013.01); *G06Q 50/01* (2013.01)

(58) Field of Classification Search
CPC ....... G06Q 20/223; G06Q 20/40; G06Q 50/01
(Continued)

(56) References Cited

U.S. PATENT DOCUMENTS 8,808,093 B1 *  8/2014  Reynolds ........... G06Q 20/3224
9,972,004 B1 *  5/2018  Donavalli .......... G06Q 20/3224
(Continued)

FOREIGN PATENT DOCUMENTS

CN  102713953 A  10/2012
CN  103179194 A   6/2013
(Continued)

OTHER PUBLICATIONS

Tencent Technology, ISRWO, PCT/CN2014/085961, Nov. 28, 2014, 9 pgs.
(Continued)

*Primary Examiner* — Lindsay M Maguire
*Assistant Examiner* — Michael J Warden
(74) *Attorney, Agent, or Firm* — Morgan, Lewis & Bockius LLP

(57) ABSTRACT

A method, system, and apparatus for facilitating a payment transaction is disclosed. A server receives an event-setup request from an event organizer to set up an event-based payment session to obtain payments for one or more attendees of a subsequent event. In response to receiving the event set-up request: the server sets up the event-based payment session in accordance with the event-setup request; and provides a payment invitation corresponding to the payment session to each of one or more invitees of the subsequent event in accordance with the event-setup request. The server then receives from at least a first invitee of the one or more invitees, a conditional acceptance to the payment invitation, the acceptance being conditioned on one or more predefined criteria.

14 Claims, 18 Drawing Sheets

(58) Field of Classification Search
USPC .......................................................... 705/44
See application file for complete search history.

(56) References Cited

U.S. PATENT DOCUMENTS

| | | | | | |
|---|---|---|---|---|---|
| 2003/0229790 | A1* | 12/2003 | Russell | ................... | G06Q 10/02 713/172 |
| 2003/0236736 | A1* | 12/2003 | Harmon | ................ | G06Q 10/02 705/37 |
| 2004/0039696 | A1* | 2/2004 | Harmon | ................ | G06Q 10/02 705/40 |
| 2004/0181468 | A1* | 9/2004 | Harmon | ............ | G06Q 10/0875 705/29 |
| 2006/0271462 | A1* | 11/2006 | Harmon | ................ | G06Q 30/02 705/35 |
| 2006/0277130 | A1* | 12/2006 | Harmon | ................ | G06Q 30/06 705/35 |
| 2007/0088624 | A1* | 4/2007 | Vaughn | ................ | G06Q 30/02 705/15 |
| 2007/0143185 | A1* | 6/2007 | Harmon | ............... | G06Q 20/045 705/14.16 |
| 2008/0082355 | A1* | 4/2008 | Leach | ................... | G06Q 30/08 705/310 |
| 2008/0097825 | A1* | 4/2008 | Leach | ................... | G06Q 30/02 705/37 |
| 2008/0097826 | A1* | 4/2008 | Leach | ................... | G06Q 30/02 705/14.4 |
| 2008/0097827 | A1* | 4/2008 | Leach | ............. | G06Q 10/06315 705/7.25 |
| 2008/0103801 | A1* | 5/2008 | Leach | ................... | G06Q 10/02 705/310 |
| 2008/0103802 | A1* | 5/2008 | Leach | ................... | G06Q 30/08 705/5 |
| 2008/0103803 | A1* | 5/2008 | Leach | ................... | G06Q 10/02 705/1.1 |
| 2008/0103878 | A1* | 5/2008 | Leach | ................... | G06Q 30/02 705/14.4 |
| 2008/0103919 | A1* | 5/2008 | Leach | ................... | G06F 21/10 705/27.1 |
| 2008/0103920 | A1* | 5/2008 | Leach | ................... | G06Q 10/02 705/26.1 |
| 2008/0109233 | A1* | 5/2008 | Leach | ............... | G06Q 30/0601 705/26.1 |
| 2008/0109234 | A1* | 5/2008 | Leach | ................... | G06Q 10/02 705/37 |
| 2008/0109296 | A1* | 5/2008 | Leach | ................... | G06Q 10/02 705/319 |
| 2008/0109297 | A1* | 5/2008 | Leach | ................... | G06Q 10/02 705/7.31 |
| 2008/0109321 | A1* | 5/2008 | Leach | ................... | G06Q 10/02 705/5 |
| 2008/0109322 | A1* | 5/2008 | Leach | ................ | G06Q 30/0641 705/27.1 |
| 2008/0109323 | A1* | 5/2008 | Leach | ................... | G06Q 10/02 705/5 |
| 2008/0109345 | A1* | 5/2008 | Leach | ................... | G06Q 30/02 705/37 |
| 2008/0243532 | A1* | 10/2008 | Leach | ................... | G06Q 30/02 705/1.1 |
| 2008/0243582 | A1* | 10/2008 | Chen | ................ | G06Q 10/06314 705/7.19 |
| 2009/0006184 | A1* | 1/2009 | Leach | ................. | G06Q 10/101 705/7.32 |
| 2009/0070249 | A1* | 3/2009 | Leach | ................... | G06Q 30/02 705/37 |
| 2009/0125380 | A1* | 5/2009 | Otto | ..................... | G06Q 10/087 705/7.29 |
| 2009/0327010 | A1* | 12/2009 | Vadhri | ................... | G06Q 20/02 705/35 |
| 2010/0120522 | A1* | 5/2010 | Englman | ............. | G07F 17/3258 463/26 |
| 2011/0196783 | A1* | 8/2011 | Liwerant | ............... | G06Q 20/06 705/39 |
| 2012/0150611 | A1* | 6/2012 | Isaacson | ................. | G06Q 30/02 705/14.27 |
| 2012/0323938 | A1* | 12/2012 | Skeen | ................. | H04L 65/4069 707/754 |
| 2013/0035114 | A1* | 2/2013 | Holden | ................... | H04W 4/08 455/456.3 |
| 2013/0198076 | A1* | 8/2013 | Zambelli Hosmer | .. | G06Q 20/12 705/44 |
| 2013/0282833 | A1* | 10/2013 | Chattopadhyay | ....... | H04L 51/32 709/206 |
| 2013/0317893 | A1* | 11/2013 | Nelson | ................. | G06Q 10/101 705/7.32 |
| 2014/0070957 | A1* | 3/2014 | Longinotti-Buitoni | ..................... | A61B 5/6804 340/870.01 |
| 2014/0207499 | A1* | 7/2014 | Fliess | ..................... | G06Q 50/12 705/5 |
| 2014/0318699 | A1* | 10/2014 | Longinotti-Buitoni | ..................... | A61B 5/0002 156/247 |
| 2014/0351033 | A1* | 11/2014 | Azevedo | ............ | G06Q 30/0222 705/14.19 |
| 2015/0242764 | A1* | 8/2015 | Subbaraj | ............ | G06Q 30/0222 705/14.19 |
| 2015/0278830 | A1* | 10/2015 | Zamer | ................ | G06Q 30/0201 705/7.29 |
| 2016/0110659 | A1* | 4/2016 | Skeen | ................... | A61B 5/6804 340/870.01 |
| 2019/0012612 | A1* | 1/2019 | Skeen | ................. | A61B 5/0002 156/247 |

FOREIGN PATENT DOCUMENTS

| | | |
|---|---|---|
| CN | 103824183 A | 5/2014 |
| WO | WO 03065260 A1 | 8/2003 |
| WO | WO 2012155644 A1 | 11/2012 |

OTHER PUBLICATIONS

Tencent Technology, IPRP, PCT/CN2014/085961, Jun. 28, 2016, 7 pgs.

* cited by examiner 9-1

9-2

9-3

9-4

1200

| 1202 | At a server having one or more processors, and memory for storing programs to be executed by the one or more processors, receive an event-setup request from an event organizer to set up an event-based payment session to obtain payments for one or more attendees of a subsequent event |

1204: The server is a server of a social network platform, wherein the event-setup request comprises an event invitation message composed by an event organizer and addressed to one or more social network contacts of the event organizer, and wherein the payment invitation comprises the event invitation message In response to receiving the event set-up request:

1206: Set up the event-based payment session in accordance with the event-setup request 1208: Provide a payment invitation corresponding to the payment session to each of one or more invitees of the subsequent event in accordance with the event-setup request 1210: Elect to invite the first invitee based on membership of the first invitee in a social networking group 1212: Receive from at least a first invitee of the one or more invitees, a conditional acceptance to the payment invitation, the acceptance being conditioned on one or more predefined criteria 1214: The acceptance to the payment session invitation is conditioned on detecting a first device associated with the first invitee at the subsequent event 1216: The acceptance to the payment session invitation is conditioned on detecting a second device associated with a second invitee identified in the conditional acceptance at the subsequent event for any duration of time

PAYMENT PROCESSING CONDITIONED ON MULTI-PARTY GEOLOCATION CONSTRAINTS

PRIORITY CLAIM AND RELATED APPLICATIONS

This application is a continuation application of PCT Patent Application No. PCT/CN2014/085961, entitled "DATA PROCESSING METHOD, APPARATUS AND SYSTEM" filed on Sep. 5, 2014, which claims priority to Chinese Patent Application No. 201310726480.5, "Data Processing Method, Apparatus and System" filed on Dec. 25, 2013, both of which are hereby incorporated by reference in their entirety.

TECHNICAL FIELD

The present application relates to the field of Internet technologies, and particularly to a data processing method, apparatus and system.

BACKGROUND

With development of network technologies, online payment applications are more and more widespread. Currently, the online payment applications mainly authenticate authentication information sent by a terminal through a server, and when the authentication passes, the server completes the payment. The specific process may be as follows:

A payment terminal sends a payment order to a server; the server sends a request message for requesting authentication to the payment terminal after receiving the payment order; the payment terminal sends authentication information to the server after receiving the request message; and the server receives the authentication information, authenticates the authentication information, and when the authentication passes, processes the payment order.

As in the conventional method, the payment is completed only by transmitting information, via a network, the information transmitted may be stolen during transmission, and others may use an account of the payment terminal for payment through the information stolen. Thus, security of the current online payment is not high. Furthermore, processing a payment transaction require payor and payee to communicate at the time of the payment transaction, causing additional inconvenience.

SUMMARY

The above deficiencies and other problems associated with authorizing a payment transaction are addressed by the techniques disclosed herein. In some embodiments, the method for authorizing a payment transaction is implemented on a computer system that has one or more processors, memory and one or more modules, programs or sets of instructions stored in the memory for performing multiple functions. Instructions for performing these functions may be included in a computer program product configured for execution by one or more processors.

In one aspect, a computer-implemented method of facilitating a payment transaction, at a payment server having one or more processors, and memory for storing programs to be executed by the one or more processors, includes receiving an event-setup request from an event organizer to set up an event-based payment session to obtain payments for one or more attendees of a subsequent event. The method includes, in response to receiving the event set-up request, setting up the event-based payment session in accordance with the event-setup request, and providing a payment invitation corresponding to the payment session to each of one or more invitees of the subsequent event in accordance with the event-setup request. The method includes receiving from at least a first invitee of the one or more invitees, a conditional acceptance to the payment invitation, the acceptance being conditioned on one or more predefined criteria.

In another aspect, a server for facilitating a payment transaction includes memory, one or more processors, and one or more programs stored in the memory and configured for execution by the one or more processors to perform the method described herein.

In another aspect, a non-transitory computer readable storage medium stores one or more programs, the one or more programs comprising instructions, which when executed by a server, cause the server to perform the method described herein.

Various advantages of the disclosed technology would be apparent in light of the descriptions below.

BRIEF DESCRIPTION OF THE DRAWINGS

The aforementioned features and advantages of the disclosure as well as additional features and advantages thereof will be more clearly understood hereinafter as a result of a detailed description of preferred embodiments when taken in conjunction with the drawings.

To illustrate the technical solutions according to the embodiments of the present application more clearly, the accompanying drawings for describing the embodiments are introduced briefly in the following. The accompanying drawings in the following description are only some embodiments of the present application; persons of ordinary skill in the art may obtain other drawings according to the accompanying drawings without paying any creative efforts.

FIGS. 12A-12B are a flow chart of another payment-related data processing method in accordance with some embodiments;

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The technical solution in the embodiments of the present application will be clearly and fully described below with reference to the accompanying drawings in the embodiments of the present application. It is obvious that the embodiments to be described are only a part rather than all of the embodiments of the present application. All other embodiments derived by persons of ordinary skill in the art based on the embodiments of the present application without carrying out creative activities should fall within the scope of the present application.

Figure 1:
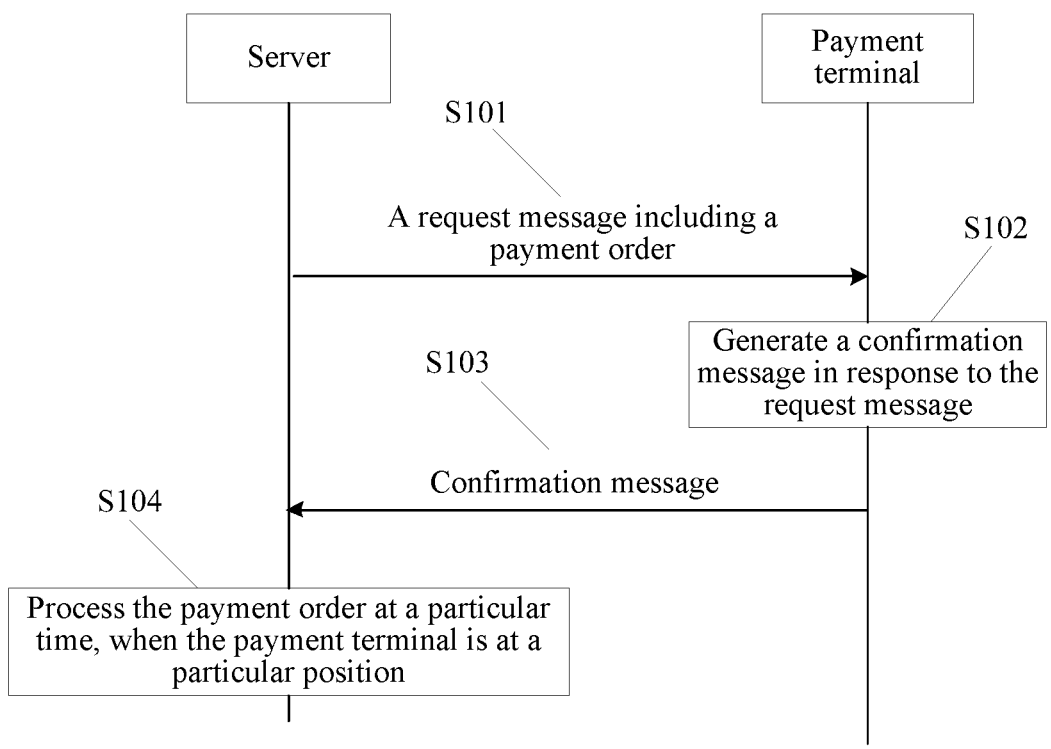
FIG. 1 is a flow chart of a payment-related data processing method according to some embodiments.

FIG. 1 is a schematic view of a data processing method according to an embodiment of the present application, as shown in FIG. 1, which includes the following steps.

S101. A server sends a request message including a payment order to a payment terminal, wherein the request message is used for requesting processing the payment order when the payment terminal is at a particular position at a particular time.

In some embodiments, the server may be a bank server or a transaction server or the like. Moreover, the payment order may be a payment order that the payment terminal applies for from the server, the payment order also may be a payment order that another terminal (e.g., a receiving terminal) sends to the server for inviting the payment terminal to pay, and the payment order also may be a payment order generated by the server. In addition, the payment order includes, but is not limited to, payment amount, a receiving account and the like.

In some embodiments, the particular time may be a particular period of time, for example, 10:00 to 12:00; the particular time also may be a particular time point, for example, 10:15. In addition, the particular position may be a particular position region, for example, a certain square or a certain mountainous area or the like.

S102. The payment terminal receives the request message, and generates a confirmation message in response to the request message, wherein the confirmation message is used for agreeing that the server processes the payment order when the payment terminal is at the particular position at the particular time.

In some embodiments, after receiving the request message, the payment terminal may display the request message. After a user of the payment terminal reads the message, he may input the confirmation message on the payment terminal.

S103. The payment terminal sends the confirmation message to the server.

S104. The server, in response to the confirmation message, processes the payment order at the particular time, when the payment terminal is at the particular position.

In some embodiments, when the payment terminal is at the particular position at the particular time, the server may process the payment order.

In some embodiments, that the server processes the payment order may be that the server controls a payment account to input money of payment amount to a receiving account; wherein the payment account may be an account pre-bound to the payment terminal, the payment amount may be the payment amount carried in the payment order, and the receiving account may be the receiving account carried in the payment order, or the receiving account may be a receiving account pre-bound to the payment order, for example, a receiving account bound to the payment order preset by the server.

In some embodiments, it can achieve through the above steps that the server can process the payment order when the payment terminal is at the particular position at the particular time as long as the server receives the confirmation message sent by the payment terminal. That is, in the method, the condition that the server processes the payment order must be that the payment terminal returns a confirmation message and the payment terminal is at the particular position at the particular time, so that payment security can be improved. In addition, when the payment terminal is at the particular position at the particular time, the server can process the payment order, that is, the payment terminal may not need to do anything when the server processes the payment order, and the server processes the payment order individually, so that the method also can improve convenience of online payment. Besides, the step S104 may be executed only when the steps S101 to S103 may be pre-executed and it reaches the particular time.

In some embodiments, the payment terminal is any device with a communication function, for example, a tablet computer, a mobile phone, an e-reader, a remote control, a Personal Computer (PC), a notebook, an on-board device, a network television, a wearable device or other smart devices with a network function.

In the technical solution, a server sends a request message including a payment order to a payment terminal, wherein the request message is used for requesting processing the payment order when the payment terminal is at a particular position at a particular time; the payment terminal receives the request message, and generates a confirmation message in response to the request message, wherein the confirmation message is used for agreeing that the server processes the payment order when the payment terminal is at the particular position at the particular time; the payment terminal sends the confirmation message to the server; and at the particular time, when the payment terminal is at the particular position, the server processes the payment order. In this way, it can achieve that the payment order is processed only after the payment terminal returns the confirmation message and when the payment terminal is at the particular position at the particular time, so that payment security can be improved.

Figure 2:
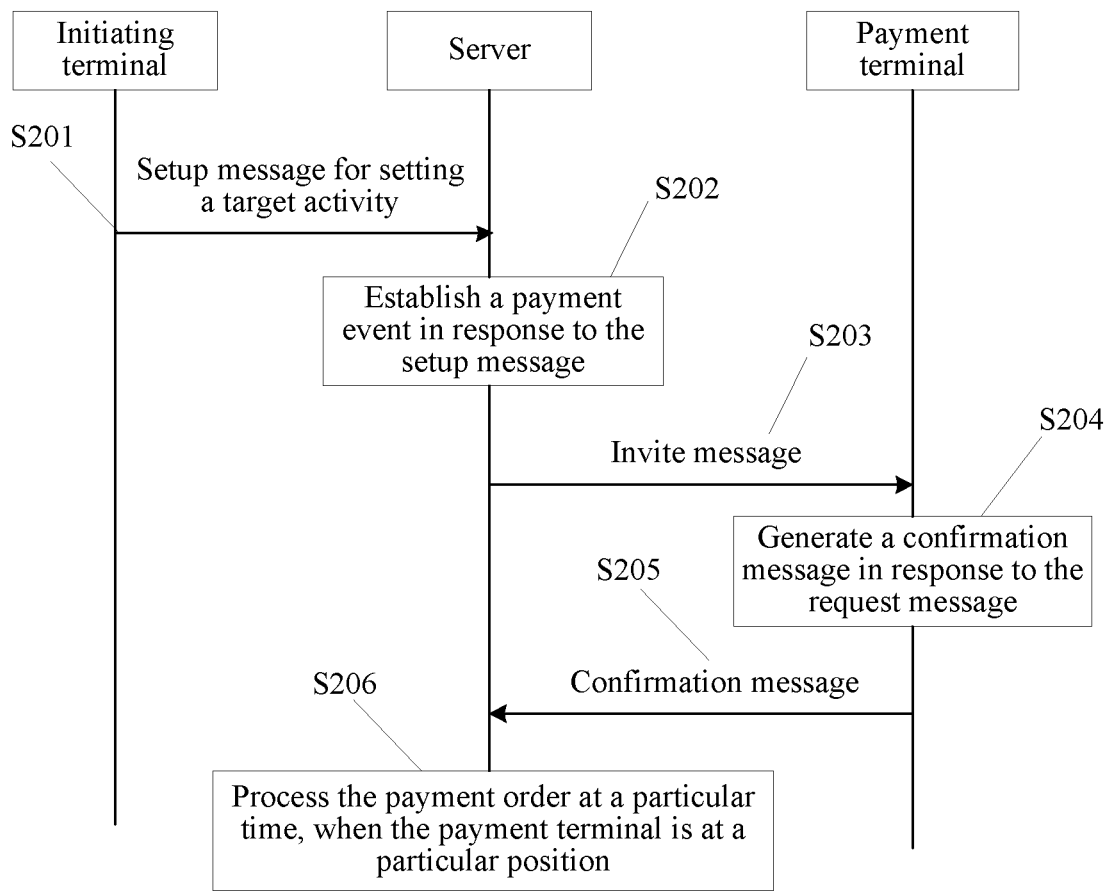
FIG. 2 is a flow chart of another payment-related data processing method according to some embodiments.

FIG. 2 is a schematic view of another data processing method according to an embodiment of the present application, as shown in FIG. 2, which includes the following steps.

S201. An initiating terminal sends a set message for setting a target activity to the server, wherein the set message includes: communication account information of a payment terminal, time information indicating a particular time, position information indicating a particular position and a payment order, the set message is used for inviting the payment terminal to participate in the target activity at the particular time and at the particular position, the payment terminal needs to pay the payment order when participating in the target activity, and the payment order includes a receiving account and payment amount.

In some embodiments, the initiating terminal may be any terminal in the field of Internet technologies except the payment terminal. Moreover, the target activity may be an outdoor or indoor activity that a user of the payment terminal participates in, for example, a gathering, a dancing party, camping or other group activities. In addition, the payment terminal may refer to one or more payment terminals. That the set message is used for inviting the payment terminal to participate in the target activity at the particular time and at the particular position may be understood as that the set message is used for inviting the user of the payment terminal to participate in the target activity at the particular time and at the particular position. When the user of the payment terminal participates in the target activity at the particular time and at the particular position, that is, when the payment terminal is at the particular position at the particular time, the payment terminal needs to pay the payment order.

In some embodiments, the communication account includes, but is not limited to, an instant messaging account, an e-mail account, a telephone account, a social networking account or the like.

In some embodiments, the initiating terminal also may be the following payment terminal, that is, the payment terminal sends the set message to the server.

S202. The server establishes a payment event in response to the setup message, wherein the payment event is processing the payment order when the payment terminal is at the particular position at the particular time.

In some embodiments, the server may establish the payment event after receiving the setup message. That the server establishes the payment event may be saving the time information, the position information and the payment order, or may be understood as that the payment event includes the time information, the position information and the payment order.

S203. The server sends an invite message for inviting the payment terminal to participate in the target activity to the payment terminal, wherein the invite message further carries the request message, and the request message is used for requesting processing the payment order when the payment terminal is at the particular position at the particular time.

In some embodiments, the invite message may be used for inviting the user of the payment terminal to participate in the target activity at the particular time and at the particular position. In addition, that the invite message carries the request message may be understood as that content of the invite message includes the request message, for example, the invite message is a text message, and content of the text may include the request message.

S204. The payment terminal receives the request message, and generates a confirmation message in response to the request message, wherein the confirmation message is used for agreeing that the server processes the payment order when the payment terminal is at the particular position at the particular time.

In some embodiments, the confirmation message may be a received confirmation message input by the user, for example, the payment terminal may display the request message after receiving the request message. After the user of the payment terminal reads the message, he may input the confirmation message on the payment terminal. Moreover, the confirmation message also may be a confirmation message automatically generated by the payment terminal. In addition, the confirmation message may be a text message, a voice message or an image message or the like.

S205. The payment terminal sends the confirmation message to the server.

S206. The server, in response to the confirmation message, processes the payment order at the particular time, when the payment terminal is at the particular position.

In some embodiments, the server may record the payment terminal after receiving the confirmation message sent by the payment terminal, for example, bind the payment terminal to the payment event. So, at the particular time, the server can process the payment order as long as the payment terminal is at the particular position.

In some embodiments, the server also may pre-acquire a payment account bound to the payment terminal, and authentication information of the payment account. For example, the payment terminal pre-binds a payment account and authentication information of the payment account on the server. So, after the server receives the confirmation message and at the particular time, when the payment terminal is at the particular position, the server can process the payment order for the payment account according to the authentication information of the payment account.

In some embodiments, the method may further include: the server receiving a payment account and authentication information sent by the payment terminal.

The step specifically may be executed before step S206. For example, the step is executed together with step S205, or the confirmation message carries the payment account and the authentication information. So, after the server receives the confirmation message and at the particular time, when the payment terminal is at the particular position, the server can process the payment order for the payment account according to the authentication information of the payment account.

In some embodiments, step S206 may include: the server, in response to the confirmation message, processing the payment order at the particular time, when the server detects that the payment terminal is at the particular position.

For example, step S206 may include: the server, in response to the confirmation message, processing the payment order at the particular time, when detecting that the payment terminal is at the particular position according to information sent by the payment terminal.

The information sent by the payment terminal may be any information sent by the payment terminal to the server, and when the payment terminal sends information to the server, the information needs to be forwarded to the server through an access point or a website or a base station, so the server can detect the position of the payment terminal through the access point or the website or the base station.

For example, step S206 may include: the server, in response to the confirmation message, at the particular time, receiving geographic information reported by the payment terminal, and when the geographic information indicates that the payment terminal is at the particular position, processing the payment order.

For example, step S206 may include: the server, in response to the confirmation message, processing the payment order at the particular time, when detecting that the payment terminal is at the particular position according to a communication account that the payment terminal logs in.

The payment terminal logs in the communication account, that is, the communication account needs to establish a communication connection with the server, so the server can detect the current position of the payment terminal according to the communication connection, so as to process the payment order at the particular time when detecting that the payment terminal is at the particular position.

In some embodiments, step S206 may further include: the server, in response to the confirmation message, sending an acknowledgment message for acknowledging payment to the payment terminal at the particular time, when detecting that the payment terminal is at the particular position; the payment terminal returning a response message to the server according to the acknowledgment message; and the server processing the payment order according to the response message.

In implementation, when the payment terminal is at the particular position at the particular time, the acknowledgment message is sent to the payment terminal, and the payment order is processed only when the response message is received. In this way, payment security can be further improved.

In some embodiments, step S206 may further include: at the particular time, when the initiating terminal is at the particular position, the server processing the payment order for the initiating terminal. For example, the server controls a payment account bound to the initiating terminal to input money of payment amount to a receiving account.

In some embodiments, after step S206, the method may further include: the server sending a payment result of processing the payment request to the payment terminal.

In this way, after the payment terminal receives the payment result, payment success or payment failure can be known, and after the payment fails, the payment terminal also may pay the payment order in another manner, for example, online transfer or the like.

In some embodiments, it can achieve through the above steps that, when the user of the payment terminal participates in the target activity at the particular time and at the particular position, that is, when the payment terminal is at the particular position at the particular time, the server may process the payment order for the payment terminal. Thus, it is not necessary to be like the existing activity, which has a tedious process that each user pays when multiple users participate in an activity requiring AA-treat payment. This embodiment only requires the user to send the confirmation message to the server in advance, and when the user of the payment terminal participates in the target activity at the particular time and at the particular position, the server may process the payment order for the payment terminal.

In the technical solution, multiple alternative implementation manners are achieved on the basis of the above embodiments, all of which can improve security of the online payment.

Figure 3:
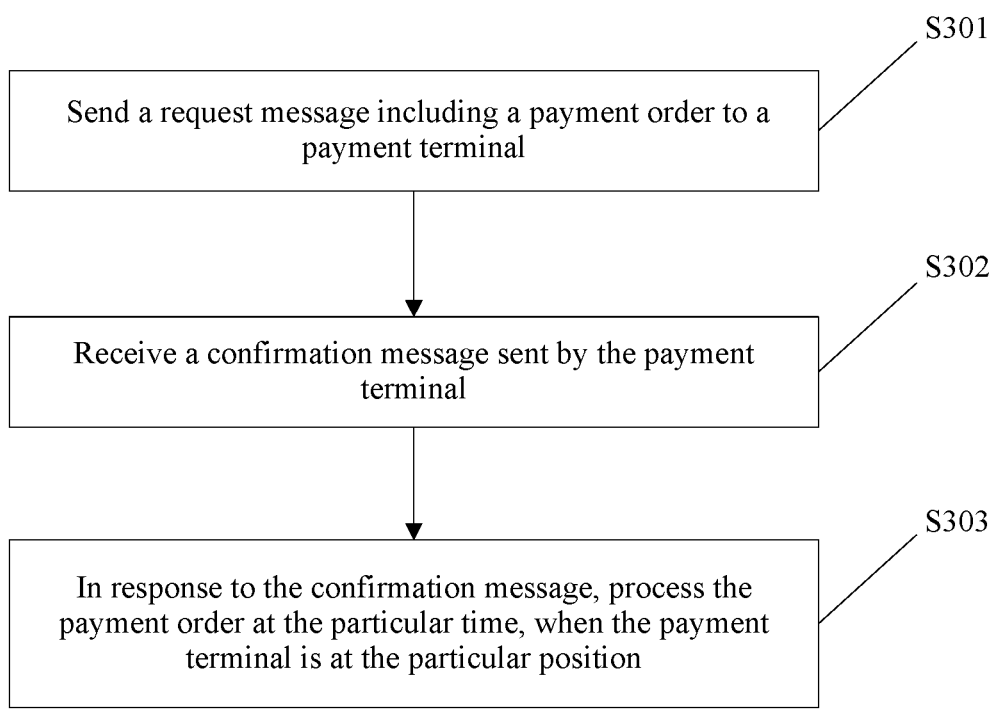
FIG. 3 is a flow chart of a further payment-related data processing method according to some embodiments.

FIG. 3 is a schematic view of a flow of a further data processing method according to an embodiment of the present application, as shown in FIG. 3, which includes the following steps.

S301. Send a request message including a payment order to the payment terminal, wherein the request message is used for requesting processing the payment order when the payment terminal is at a particular position at a particular time.

In some embodiments, the payment order may be a payment order that the payment terminal applies for, the payment order may be a received payment order sent by another terminal (e.g., a receiving terminal) for inviting the payment terminal to pay, and the payment order also may be a payment order generated actively or the like. In addition, the payment order includes, but is not limited to, payment amount, a receiving account and the like.

S302. Receive a confirmation message sent by the payment terminal, wherein the confirmation message is used for agreeing that the server processes the payment order when the payment terminal is at the particular position at the particular time.

In some embodiments, the payment terminal may display the request message after receiving the request message. After reading the message, the user may input the confirmation message on the payment terminal, and the payment terminal returns the confirmation message.

S303. In response to the confirmation message, process the payment order at the particular time, when the payment terminal is at the particular position.

In some embodiments, it can achieve through the above steps that the payment order may be processed after the confirmation message sent by the payment terminal is received and when the payment terminal is at the particular position at the particular time.

In some embodiments, before step S301, the method may further include: receiving a set message sent by an initiating terminal for setting a target activity, wherein the set message includes: communication account information of the payment terminal, time information indicating the particular time, position information indicating the particular position and the payment order, the set message is used for inviting the payment terminal to participate in the target activity at the particular time and at the particular position, the payment terminal needs to pay the payment order when participating in the target activity, and the payment order includes a receiving account and payment amount; and establishing a payment event in response to the set message; wherein the payment event is processing the payment order when the payment terminal is at the particular position at the particular time.

In some embodiments, the initiating terminal may be any terminal in the field of Internet technologies except the payment terminal. Moreover, the target activity may be an outdoor or indoor activity that a user of the payment terminal participates in, for example, a gathering, a dancing party, camping or other group activities. In addition, the payment terminal may refer to one or more payment terminals. That the set message is used for inviting the payment terminal to participate in the target activity at the particular time and at the particular position may be understood as that the set message is used for inviting the user of the payment terminal to participate in the target activity at the particular time and at the particular position. When the user of the payment terminal participates in the target activity at the particular time and at the particular position, that is, when the payment terminal is at the particular position at the particular time, the payment terminal needs to pay the payment order.

In some embodiments, the communication account includes, but is not limited to, an instant messaging account, an e-mail account, a telephone account, a social networking account or the like.

In some embodiments, the payment event may be established after the set message is received. Establishing the payment event may be saving the time information, the position information and the payment order, or may be understood as that the payment event includes the time information, the position information and the payment order.

In some embodiments, step S302 may include: sending an invite message for inviting the payment terminal to participate in the target activity to the payment terminal, wherein the invite message further carries the request message.

In some embodiments, the invite message may be used for inviting the user of the payment terminal to participate in the target activity at the particular time and at the particular position. In addition, that the invite message carries the request message may be understood as that content of the invite message includes the request message, for example, the invite message is a text message, and content of the text may include the request message.

In some embodiments, step S303 may include: in response to the confirmation message, processing the payment order at the particular time, when detecting that the payment terminal is at the particular position.

In some embodiments, step S303 may include: in response to the confirmation message, processing the payment order at the particular time, when detecting that the payment terminal is at the particular position according to information sent by the payment terminal.

In some embodiments, step S303 may include: in response to the confirmation message, at the particular time, receiving geographic information reported by the payment terminal, and when the geographic information indicates that the payment terminal is at the particular position, processing the payment order.

In some embodiments, step S303 may include: in response to the confirmation message, processing the payment order at the particular time, when detecting that the payment terminal is at the particular position according to a communication account that the payment terminal logs in.

In some embodiments, step S303 may include: in response to the confirmation message, sending an acknowledgment message for acknowledging payment to the payment terminal at the particular time, when detecting that the payment terminal is at the particular position; receiving a response message returned by the payment terminal according to the acknowledgment message; and processing the payment order according to the response message.

In implementation, when the payment terminal is at the particular position at the particular time, the acknowledgment message is sent to the payment terminal, and the payment order is processed only when the response message is received. In this way, payment security can be further improved.

In some embodiments, the method may be applied to a server, for example, a bank server or a transaction server or the like.

The technical solution includes: sending a request message including a payment order to the payment terminal, wherein the request message is used for requesting processing the payment order when the payment terminal is at a particular position at a particular time; receiving a confirmation message sent by the payment terminal, wherein the confirmation message is used for agreeing that the server processes the payment order when the payment terminal is at the particular position at the particular time; and processing the payment order at the particular time, when the payment terminal is at the particular position. So, security of online payment can be improved.

Figure 4:
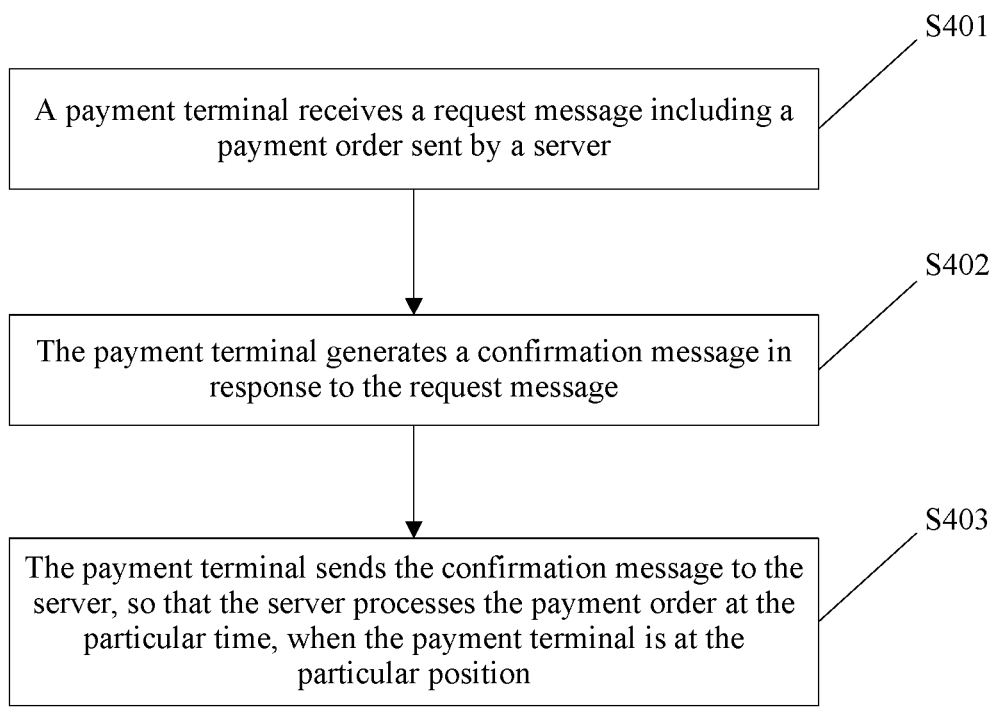
FIG. 4 is a flow chart of another payment-related data processing method according to some embodiments.

FIG. 4 is a schematic view of a flow of a yet another data processing method according to an embodiment of the present application, as shown in FIG. 4, which includes the following steps.

S401. A payment terminal receives a request message including a payment order sent by a server, wherein the request message is used for requesting that the server processes the payment order when the payment terminal is at a particular position at a particular time.

S402. The payment terminal generates a confirmation message in response to the request message, wherein the confirmation message is used for agreeing that the server processes the payment order when the payment terminal is at the particular position at the particular time.

S403. The payment terminal sends the confirmation message to the server, so that the server processes the payment order when the payment terminal is at the particular position at the particular time.

In some embodiments, after the server receives the confirmation message, the server processes the payment order when at the particular time, the payment terminal is at the particular position.

In some embodiments, the payment terminal is any device with a communication function, for example, a tablet computer, a mobile phone, an e-reader, a remote control, a PC, a notebook, an on-board device, a network television, a wearable device or other smart devices with a network function.

In the technical solution, a payment terminal receives a request message including a payment order sent by a server, wherein the request message is used for requesting processing the payment order when the payment terminal is at a particular position at a particular time; the payment terminal generates a confirmation message in response to the request message, wherein the confirmation message is used for agreeing that the server processes the payment order when the payment terminal is at the particular position at the particular time; and the payment terminal sends the confirmation message to the server, so that the server processes the payment order when the payment terminal is at the particular position at the particular time. So, payment security can be improved.

Figure 5:
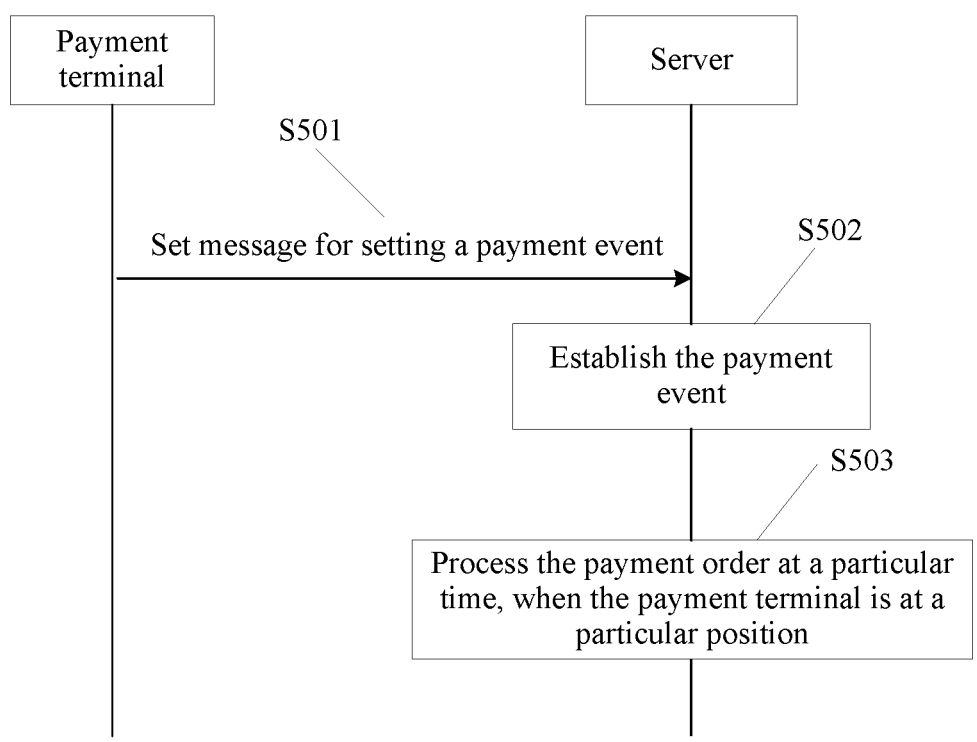
FIG. 5 is a flow chart of another payment-related data processing method according to some embodiments.

FIG. 5 is a schematic view of another data processing method according to an embodiment of the present application, as shown in FIG. 5, which includes the following steps.

S501. A payment terminal sends a set message for setting a payment event to a server, wherein the set message includes: time information indicating a particular time, position information indicating a particular position and a payment order, and the payment event is processing the payment order when the payment terminal is at the particular position at the particular time.

In some embodiments, the particular time may be a particular period of time, for example, 10:00 to 12:00; the particular time also may be a particular time point, for example, 10:15. In addition, the particular position may be a particular position region, for example, a certain square or a certain mountainous area or the like.

In some embodiments, the payment order may include a payment account and payment amount, and also may include a receiving account and the like.

S502. The server establishes the payment event.

In some embodiments, the server may establish the payment event after receiving the set message. That the server establishes the payment event may be saving the time information, the position information and the payment order, or may be understood as that the payment event includes the time information, the position information and the payment order.

S503. The server, in response to the payment event, processes the payment order at the particular time, when the payment terminal is at the particular position.

In some embodiments, the server also may pre-acquire a payment account bound to the payment terminal, and authentication information of the payment account. For example, the payment terminal pre-binds a payment account and authentication information of the payment account on the server. So, after the server receives the confirmation message and at the particular time, when the payment terminal is at the particular position, the server can process the payment order for the payment account according to the authentication information of the payment account.

In some embodiments, the method may further include: the server receiving a payment account and authentication information sent by the payment terminal.

The step may be executed before step S503.

In some embodiments, step S503 may include: the server responding to the payment event, and at the particular time, when detecting that the payment terminal is at the particular position, the server processing the payment order.

In some embodiments, step S503 may include: the server, in response to the payment event, processing the payment order at the particular time, when detecting that the payment terminal is at the particular position according to information sent by the payment terminal.

The information sent by the payment terminal may be any information sent by the payment terminal to the server, and when the payment terminal sends information to the server, the information needs to be forwarded to the server through an access point or a website or a base station, so the server can detect the position of the payment terminal through the access point or the website or the base station.

For example, step S503 may include: the server, in response to the payment event, at the particular time, receiving geographic information reported by the payment terminal, and when the geographic information indicates that the payment terminal is at the particular position, processing the payment order.

For example, step S503 may include: the server, in response to the payment event, processing the payment order at the particular time, when detecting that the payment terminal is at the particular position according to a communication account that the payment terminal logs in.

The payment terminal logs in the communication account, that is, the communication account needs to establish a communication connection with the server, so the server can detect the current position of the payment terminal according to the communication connection, so as to process the payment order at the particular time when detecting that the payment terminal is at the particular position.

In some embodiments, step S503 may further include: the server, in response to the payment event, sending an acknowledgment message for acknowledging payment to the payment terminal at the particular time, when detecting that the payment terminal is at the particular position; the payment terminal returning a response message to the server according to the acknowledgment message; and the server processing the payment order according to the response message.

In implementation, when the payment terminal is at the particular position at the particular time, the acknowledgment message is sent to the payment terminal, and the payment order is processed only when the response message is received. In this way, payment security can be further improved.

In some embodiments, it can achieve through the above steps that, after the server receives the set message, the server can process the payment order when the payment terminal is at the particular position at the particular time. That is, in the method, the condition that the server processes the payment order must be that the payment terminal pre-sends the set message and the payment terminal is at the particular position at the particular time, so that payment security can be improved. Moreover, when the payment terminal is at the particular position at the particular time, the server can process the payment order, that is, the payment terminal may not need to do anything when the server processes the payment order, so that the method also can improve convenience of online payment. In addition, the step S503 may be executed only when the steps S501 to S502 may be pre-executed and it reaches the particular time.

It can achieve through the above method completion of quick fixed-time fixed-position payment for the payment terminal, for example, the payment terminal has some payment events in particular positions at particular times, for example, pay the rent, take a bus, pay a mortgage and the like. In this way, as long as the payment terminal pre-sends the set message to the server, payment is directly completed when it reaches the particular time and the particular position of the payment, so as to improve convenience of the payment.

In some embodiments, the payment terminal is any device with a communication function, for example, a tablet computer, a mobile phone, an e-reader, a remote control, a PC, a notebook, an on-board device, a network television, a wearable device or other smart devices with a network function.

In the technical solution, a payment terminal sends a set message for setting a payment event to a server; the server establishes the payment event; and at the particular time, when the payment terminal is at the particular position, the server processes the payment order. In this way, it can achieve that the payment order is processed only after the payment terminal returns a confirmation message and when at the particular time, the payment terminal is at the particular position, so that payment security can be improved.

Figure 6:
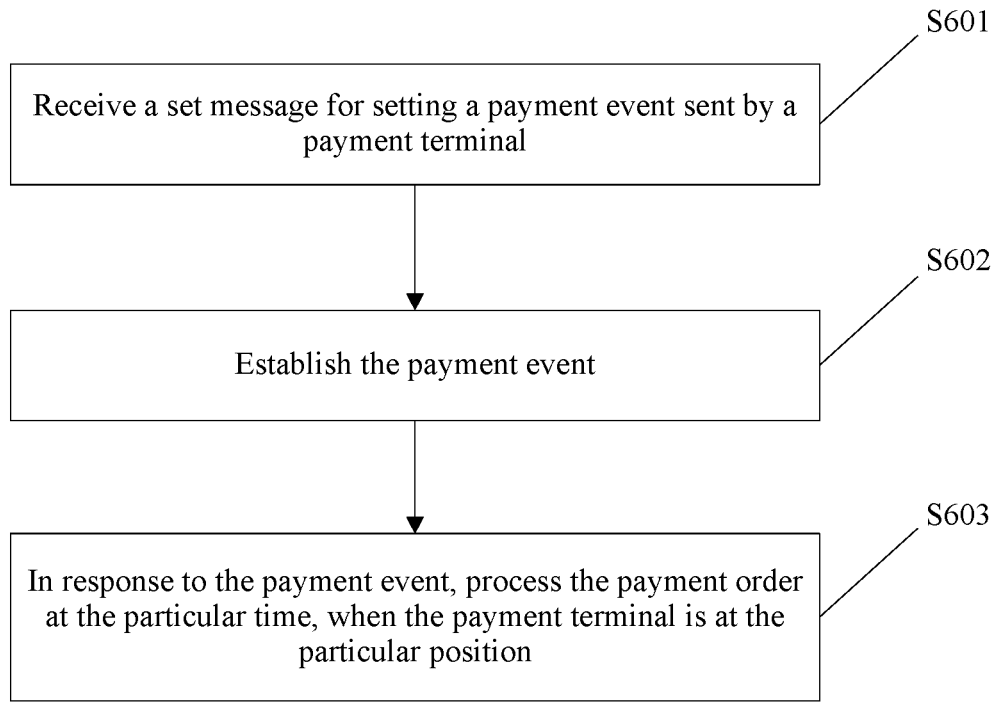
FIG. 6 is a flow chart of a flow of a further payment-related data processing method according to some embodiments.

FIG. 6 is a schematic view of a further data processing method according to an embodiment of the present application, as shown in FIG. 6, which includes the following steps.

S601. Receive a set message for setting a payment event sent by a payment terminal, wherein the set message includes: time information indicating a particular time, position information indicating a particular position and a payment order, and the payment event is processing the payment order when the payment terminal is at the particular position at the particular time.

In some embodiments, the particular time may be a particular period of time, for example, 10:00 to 12:00; the particular time also may be a particular time point, for example, 10:15. In addition, the particular position may be a particular position region, for example, a certain square or a certain mountainous area or the like.

In some embodiments, the payment order may include a payment account and payment amount, and also may include a receiving account and the like.

S602. Establish the payment event.

In some embodiments, the payment event may be established after the set message is received. Establishing the payment event may be saving the time information, the position information and the payment order, or may be understood as that the payment event includes the time information, the position information and the payment order.

S603. In response to the payment event, process the payment order at the particular time, when the payment terminal is at the particular position.

In some embodiments, step S603 may include: in response to the payment event, processing the payment order at the particular time, when detecting that the payment terminal is at the particular position.

In some embodiments, step S603 may include: in response to the payment event, processing the payment order at the particular time, when detecting that the payment terminal is at the particular position according to information sent by the payment terminal.

In some embodiments, step S603 may include: in response to the payment event, at the particular time, receiving geographic information reported by the payment terminal, and when the geographic information indicates that the payment terminal is at the particular position, processing the payment order.

In some embodiments, step S603 may include: in response to the payment event, processing the payment order at the particular time, when detecting that the payment terminal is at the particular position according to a communication account that the payment terminal logs in.

In some embodiments, step S603 may include: in response to the payment event, sending an acknowledgment message for acknowledging payment to the payment terminal at the particular time, when detecting that the payment terminal is at the particular position; receiving a response message returned by the payment terminal according to the acknowledgment message; and processing the payment order according to the response message.

In implementation, when the payment terminal is at the particular position at the particular time, the acknowledgment message is sent to the payment terminal, and the payment order is processed only when the response message is received. In this way, payment security can be further improved.

In some embodiments, the method may be applied to a server, for example, a bank server or a transaction server or the like.

The technical solution includes: receiving a set message for setting a payment event sent by a payment terminal; establishing the payment event; and processing the payment order at the particular time, when the payment terminal is at the particular position. So, security of online payment can be improved.

Figure 7:
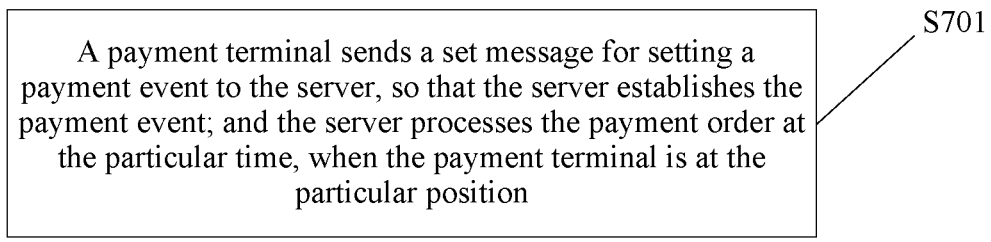
FIG. 7 is a flow chart of another payment-related data processing method according to some embodiments.

FIG. 7 is a schematic view of a yet another data processing method according to an embodiment of the present application, as shown in FIG. 7, which includes the following step.

S701. A payment terminal sends a set message for setting a payment event to the server, wherein the set message includes: time information indicating a particular time, position information indicating a particular position and a payment order, the payment event is that the server processes the payment order when the payment terminal is at the particular position at the particular time, so that the server establishes the payment event, and at the particular time, when the payment terminal is at the particular position, the server processes the payment order.

In some embodiments, the particular time may be a particular period of time, for example, 10:00 to 12:00; the particular time also may be a particular time point, for example, 10:15. In addition, the particular position may be a particular position region, for example, a certain square or a certain mountainous area or the like.

In some embodiments, the payment order may include a payment account and payment amount, and also may include a receiving account and the like.

In some embodiments, after the server receives the confirmation message, the server processes the payment order when at the particular time, the payment terminal is at the particular position.

In some embodiments, the payment terminal is any device with a communication function, for example, a tablet computer, a mobile phone, an e-reader, a remote control, a PC, a notebook, an on-board device, a network television, a wearable device or other smart devices with a network function.

In the technical solution, a payment terminal sends a set message for setting a payment event to the server, wherein the set message includes: time information indicating a particular time, position information indicating a particular position and a payment order, the payment event is that the server processes the payment order when the payment terminal is at the particular position at the particular time, so that the server establishes the payment event, and at the particular time, when the payment terminal is at the particular position, the server processes the payment order. So, payment security can be improved.

Figure 8:
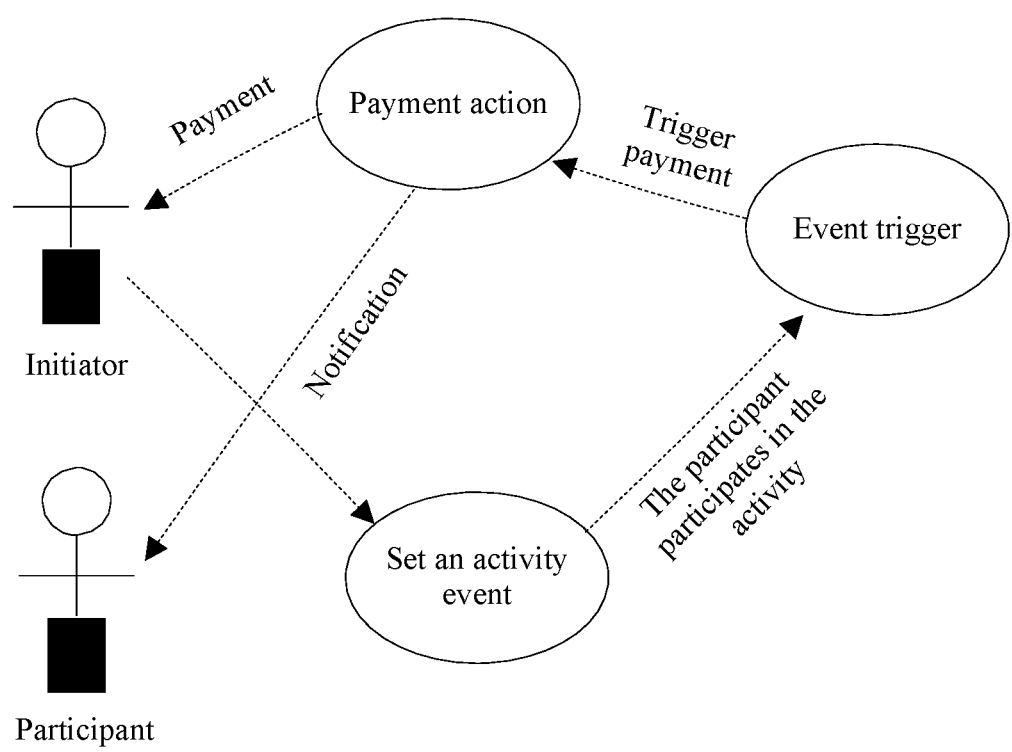
FIG. 8 is a block diagram of an alternative application scenario according to some embodiments.

FIG. 8 is a schematic view of an alternative application scenario according to an embodiment of the present application.

An activity initiator sets an activity event for a server, wherein the activity event is an activity event participated in at a particular time and at a particular position, and participants participating in the activity event need to online pay activity funds, wherein a trigger condition of paying the activity funds is triggering when a user terminal is at a particular position at a particular time, that is, online payment of the activity funds is triggered once a user participates in the activity, besides, communication account information of the participants may be sent to the server when the activity event is set. After the server sets the activity event, the server may invite the participants to participate in the activity event at the particular time and at the particular position. When the participants receive an invitation sent by the server, a confirmation message indicating that the participants determine to participate in the activity event may be sent to the server after the participants agree the invitation. After receiving the confirmation message, and when detecting that the participants participate in the activity event at the particular time, that is, terminals of the participants are at the particular position at the particular time, the server processes payment actions for the participants, controls payment accounts of the participants to pay the activity funds to the receiving account of the initiator, and sends a payment notification to the participants upon completion of the payment. In this way, the participants may complete payment of the activity funds only by returning a confirmation message to the server before participating in the activity event, for example, as shown in FIG. 9-1, before a participant participates in an activity event, a terminal of the participant receives an invitation, and content of the invitation may be "The initiator invites you to participate in an activity event in XX position at XX time on XX day, and online payment of activity funds is triggered upon participation in the activity event;" when the participant agrees to participate in the activity event, a confirmation message may be returned to the server as shown in FIG. 9-2, and content of the confirmation message may be "Confirm to participate." In this way, when the participant participates in the activity event in XX position at XX time on XX day, the server may process the payment action.

Figure 9:
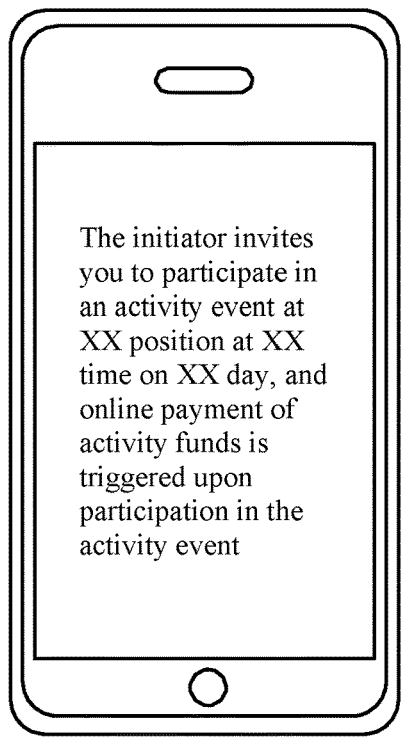
FIG. 9 is a representation of several payment-related user interfaces according to some embodiments.
Figure 9:
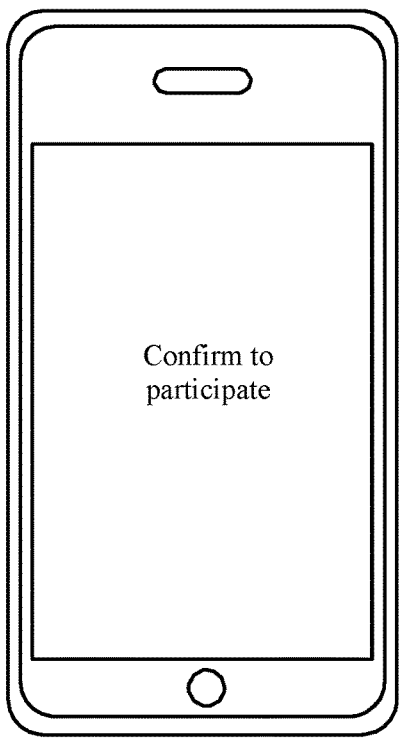
Figure 9:
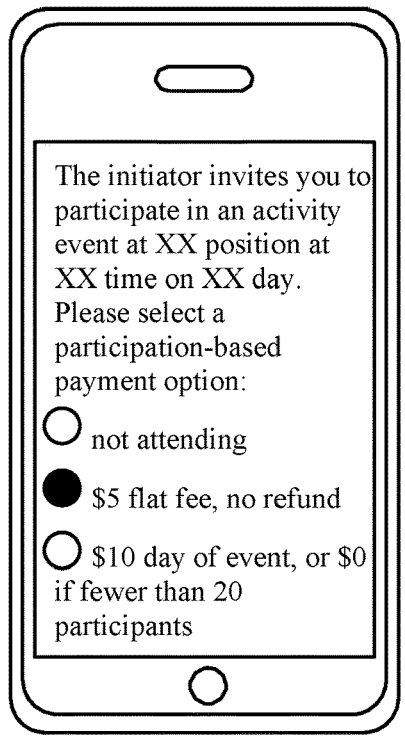
Figure 9:
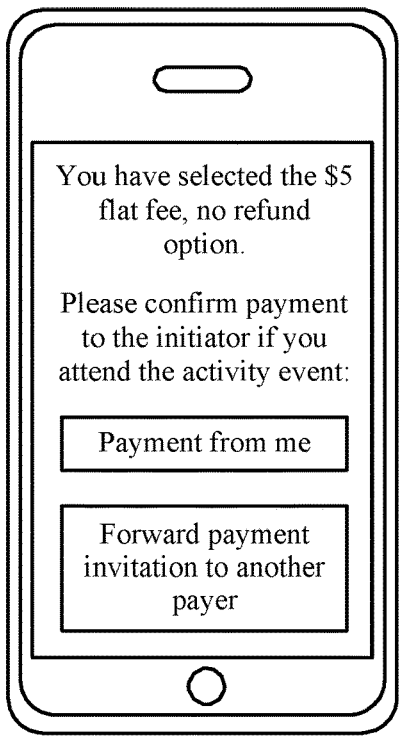

FIG. 9 also illustrates another two exemplary user interfaces, 9-3 and 9-4. In exemplary user interface 9-3, the participant's device displays a payment invitation with various payment options. In some embodiments, the participant can conditionally accept a payment request for an event (e.g., conditioned on the participant's attendance or participation at the event), and in some embodiments, the participant can choose from various amounts or terms of payment (e.g., paying a $5 flat fee, or choosing the $10 or $0 option depending on the participation at the event).

Exemplary user interface 9-4 displays options that the participant can choose from, regarding the source of payment funds to the organizer of the event. For example, as shown in user interface 9-4, the payment can be made from the participant (e.g., by selecting "Payment from me") or the payment can be made from another payer (e.g., a sponsor of the participant or a reimbursing payer).

Figure 10:
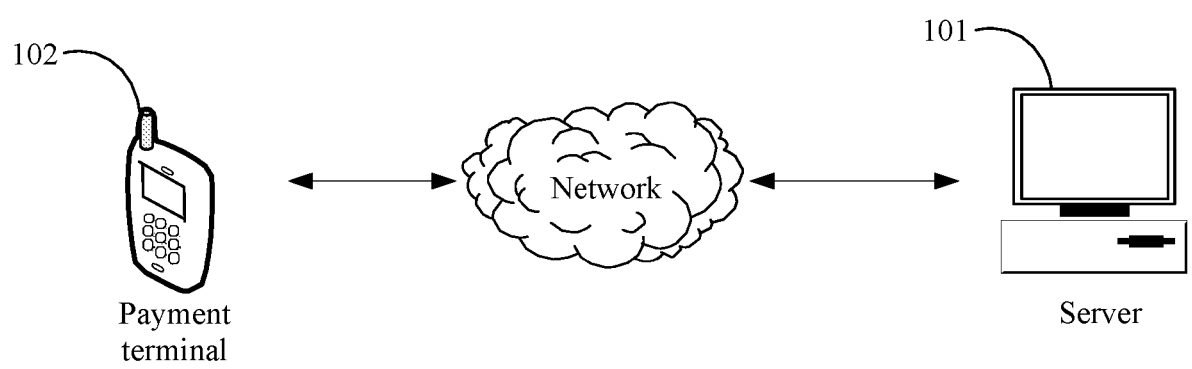
FIG. 10 is a block diagram of a payment-related data processing system according to some embodiments.

FIG. 10 is a schematic structural view of a data processing system according to an embodiment of the present application, as shown in FIG. 10, which includes: a server 101 and a payment terminal 102, wherein: the server 101 is used for sending a request message including a payment order to the payment terminal 102, wherein the request message is used for requesting processing the payment order when the payment terminal 102 is at a particular position at a particular time.

In some embodiments, the server 101 may be a bank server or a transaction server or the like. In addition, the payment order may be a payment order that the payment terminal 102 applies for from the server 101, the payment order also may be a payment order that another terminal (e.g., a receiving terminal) sends to the server 101 for inviting the payment terminal 102 to pay, and the payment order also may be a payment order generated by the server 101. Besides, the payment order includes, but is not limited to, payment amount, a receiving account and the like.

In some embodiments, the particular time may be a particular period of time, for example, 10:00 to 12:00; the particular time also may be a particular time point, for example, 10:15. In addition, the particular position may be a particular position region, for example, a certain square or a certain mountainous area or the like.

The payment terminal 102 is used for receiving the request message, and generating a confirmation message in response to the request message, wherein the confirmation message is used for agreeing that the server 101 processes the payment order when the payment terminal 102 is at the particular position at the particular time.

In some embodiments, after receiving the request message, the payment terminal 102 may display the request message. After a user of the payment terminal 102 reads the message, he may input the confirmation message on the payment terminal 102.

The payment terminal 102 is further used for sending the confirmation message to the server 101.

The server 101 is further used for, in response to the confirmation message, processing the payment order at the particular time, when the payment terminal 102 is at the particular position.

In some embodiments, when the payment terminal 102 is at the particular position at the particular time, the server 101 may process the payment order.

In some embodiments, that the server 101 processes the payment order may be that the server 101 controls a payment account to input money of payment amount to a receiving account; wherein the payment account may be an account pre-bound to the payment terminal 102, the payment amount may be the payment amount carried in the payment order, and the receiving account may be the receiving account carried in the payment order, or the receiving account may be a receiving account pre-bound to the payment order, for example, a receiving account bound to the payment order preset by the server 101.

In the technical solution, a server sends a request message including a payment order to a payment terminal, wherein the request message is used for requesting processing the payment order when the payment terminal is at a particular position at a particular time; the payment terminal receives the request message, and generates a confirmation message in response to the request message, wherein the confirmation message is used for agreeing that the server processes the payment order when the payment terminal is at the particular position at the particular time; the payment terminal sends the confirmation message to the server; and at the particular time, when the payment terminal is at the particular position, the server processes the payment order. In this way, it can achieve that the payment order is processed only after the payment terminal returns the confirmation message and when the payment terminal is at the particular position at the particular time, so that payment security can be improved.

Figure 11:
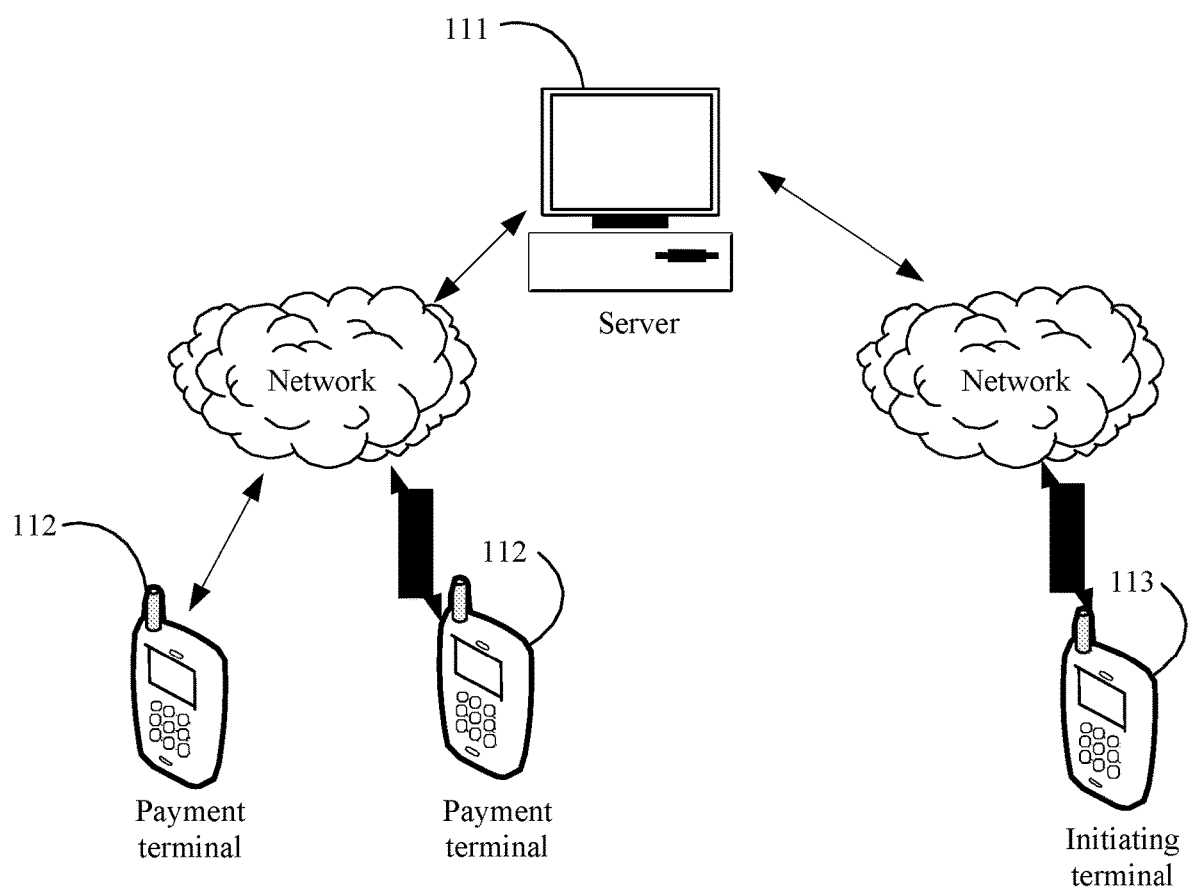
FIG. 11 is a block diagram of another payment-related data processing system according to some embodiments.

FIG. 11 is a schematic structural view of another data processing system according to an embodiment of the present application, as shown in FIG. 11, which includes: a server 111, a payment terminal 112 and an initiating terminal 113, wherein: the initiating terminal 113 is used for sending a set message for setting a target activity to the server 111, wherein the set message includes: communication account information of the payment terminal 112, time information indicating the particular time, position information indicating the particular position and the payment order, the set message is used for inviting the payment terminal 112 to participate in the target activity at the particular time and at the particular position, the payment terminal 112 needs to pay the payment order when participating in the target activity, and the payment order includes a receiving account and payment amount.

In some embodiments, the initiating terminal 113 may be any terminal in the field of Internet technologies except the payment terminal 112. Moreover, the target activity may be an outdoor or indoor activity that a user of the payment terminal 112 participates in, for example, a gathering, a dancing party, camping or other group activities. In addition, the payment terminal 112 may refer to one or more payment terminals 112. That the set message is used for inviting the payment terminal 112 to participate in the target activity at the particular time and at the particular position may be understood as that the set message is used for inviting the user of the payment terminal 112 to participate in the target activity at the particular time and at the particular position. When the user of the payment terminal 112 participates in the target activity at the particular time and at the particular position, that is, when the payment terminal 112 is at the particular position at the particular time, the payment terminal 112 needs to pay the payment order.

In some embodiments, the communication account includes, but is not limited to, an instant messaging account, an e-mail account, a telephone account, a social networking account or the like.

In some embodiments, the initiating terminal 113 also may be the payment terminal 112 in this embodiment, that is, the payment terminal 112 sends the set message to the server 111. That is, the initiating terminal 113 also needs to pay the payment order.

The server 111 is used for establishing a payment event in response to the set message; wherein the payment event is processing the payment order when the payment terminal 112 is at the particular position at the particular time.

In some embodiments, the server 111 may establish the payment event after receiving the set message. That the server 111 establishes the payment event may be saving the time information, the position information and the payment order, or may be understood as that the payment event includes the time information, the position information and the payment order.

The server 111 is further used for sending an invite message for inviting the payment terminal 112 to participate in the target activity to the payment terminal 112, wherein the invite message further carries the request message, and the request message is used for requesting processing the payment order when the payment terminal 112 is at the particular position at the particular time.

In some embodiments, the invite message may be used for inviting the user of the payment terminal 112 to participate in the target activity at the particular time and at the particular position. In addition, that the invite message carries the request message may be understood as that content of the invite message includes the request message, for example, the invite message is a text message, and content of the text may include the request message.

The payment terminal 112 receives the request message, and generates a confirmation message in response to the request message, wherein the confirmation message is used for agreeing that the server 111 processes the payment order when the payment terminal 112 is at the particular position at the particular time.

In some embodiments, the payment terminal 112 may display the request message after receiving the request message. After the user of the payment terminal 112 reads the message, he may input the confirmation message on the payment terminal 112. In addition, the confirmation message may be a text message, a voice message or an image message or the like.

The payment terminal 112 is further used for sending the confirmation message to the server 111.

The server 111 is further used for, in response to the confirmation message, at the particular time, when the payment terminal 112 is at the particular position, processing the payment order.

In some embodiments, the server 111 may record the payment terminal 112 after receiving the confirmation message sent by the payment terminal 112, for example, bind the payment terminal 112 to the payment event. So, at the particular time, the server 111 can process the payment order as long as the payment terminal 112 is at the particular position.

In some embodiments, the server 111 also may pre-acquire a payment account bound to the payment terminal 112, and authentication information of the payment account. For example, the payment terminal 112 pre-binds a payment account and authentication information of the payment account on the server 111. So, after the server 111 receives the confirmation message and when at the particular time, the payment terminal 112 is at the particular position, the server 111 can process the payment order for the payment account according to the authentication information of the payment account.

In some embodiments, the server 111 may be further used for receiving a payment account and authentication information sent by the payment terminal 112.

In this way, after the server 111 receives the confirmation message and at the particular time, when the payment terminal 112 is at the particular position, the server 111 can process the payment order for the payment account according to the authentication information of the payment account.

The server 111 may be further used for, in response to the confirmation message, processing the payment order at the particular time, when detecting that the payment terminal 112 is at the particular position according to information sent by the payment terminal 112.

In some embodiments, the server 111 may be further used for, in response to the confirmation message, at the particular time, receiving geographic information reported by the payment terminal 112, and when the geographic information indicates that the payment terminal 112 is at the particular position, processing the payment order.

In some embodiments, the server 111 may be further used for, in response to the confirmation message, processing the payment order at the particular time, when detecting that the payment terminal 112 is at the particular position according to a communication account that the payment terminal 112 logs in.

In some embodiments, the server 111 may be further used for, in response to the confirmation message, sending an acknowledgment message for acknowledging payment to the payment terminal 112 at the particular time, when detecting that the payment terminal 112 is at the particular position; the payment terminal 112 may be further used for returning a response message to the server 111 according to the acknowledgment message; and In some embodiments, the server 111 may process the payment order according to the response message.

In some embodiments, the server 111 may be further used for processing the payment order for the initiating terminal 113 at the particular time, when the initiating terminal 113 is at the particular position. For example, the server 111 controls a payment account bound to the initiating terminal 113 to input money of payment amount to a receiving account.

In some embodiments, the server 111 may be further used for sending a payment result of processing the payment request to the payment terminal 112.

In this way, after the payment terminal 112 receives the payment result, payment success or payment failure can be known, and after the payment fails, the payment terminal 112 also may pay the payment order in another manner, for example, online transfer or the like.

In the technical solution, multiple alternative implementation manners are achieved on the basis of the above embodiments, all of which can improve security of the online payment.

Figure 12B:
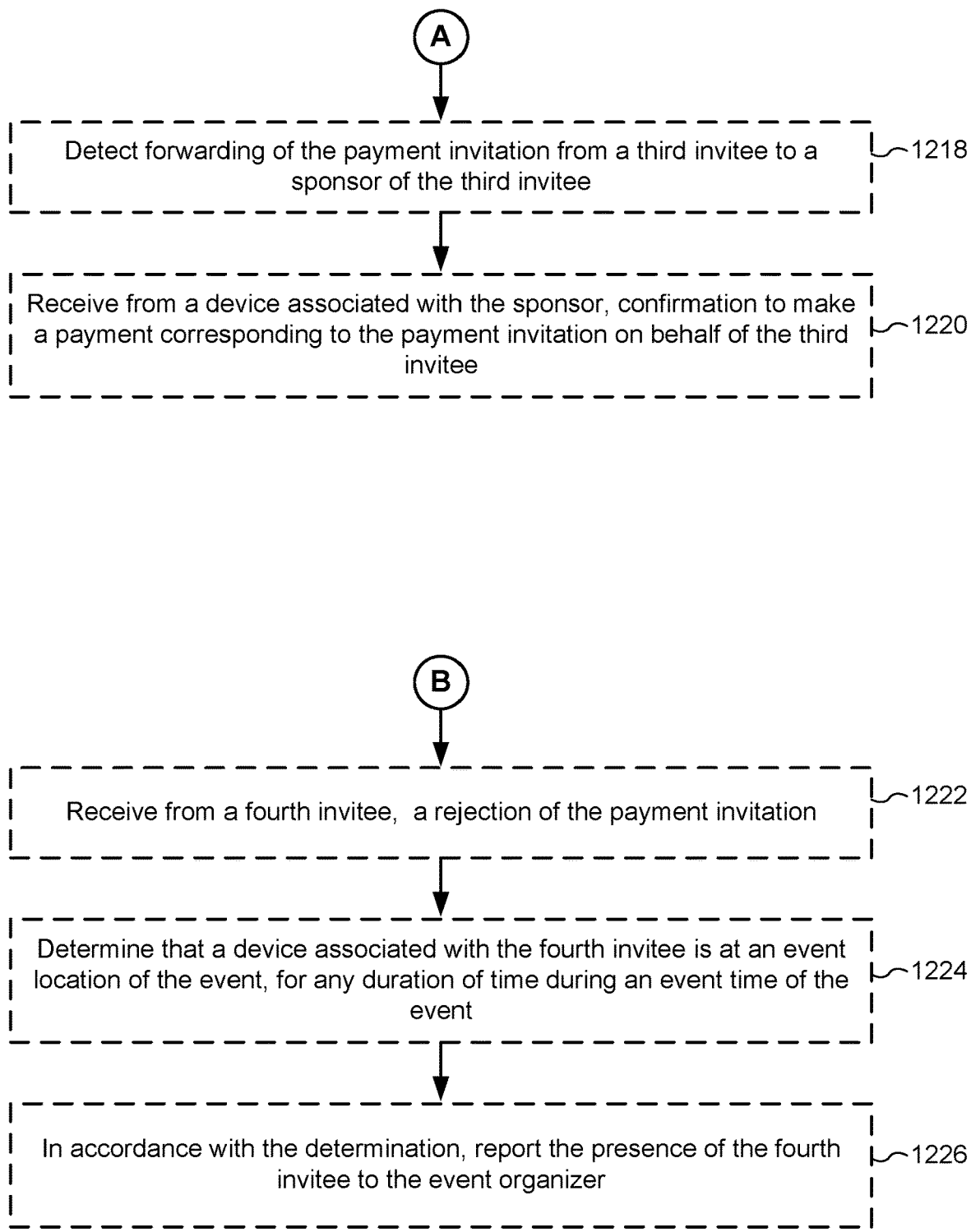

FIGS. 12A-12B are a flow chart of a method 1200 of authorizing a payment transaction, at a server in accordance with some implementations of the present application. At a server having one or more processors, and memory for storing programs to be executed by the one or more processors, the method 1200 comprises receiving (1202) an event-setup request from an event organizer to set up an event-based payment session to obtain payments for one or more attendees of a subsequent event (e.g., to solicit contributions toward a party, to charge clients for a yoga class, to charge attendees of a concert etc.). In some embodiments, the server is a server of a social network platform, and the event-setup request comprises (1204) an event invitation message composed by an event organizer and addressed to one or more social network contacts of the event organizer, and a payment invitation (generated and sent by the server) comprises the event invitation message.

In some embodiments, the event-setup request has various details like the date, time, location or other descriptive information of the event. In some embodiments, the event-setup request also includes details regarding payment, such as a payment amount, payment options, payment forwarding or reimbursement options. In some embodiments, the event-setup request also comprises a deadline for invitees to accept an invitation to the event, or instructions for the server regarding when to send out invitations, how often to send invitees a reminder or whether to show all invitees that have been invited or have accepted or declined the invitation, to other invitees. In some embodiments, the event-setup request includes an invitee list or specifies that the server has the authority to invite guests to the event.

The method includes, in response to receiving the event set-up request, setting (1206) up the event-based payment session in accordance with the event-setup request, and providing (1208) a payment invitation corresponding to the payment session to each of one or more invitees of the subsequent event in accordance with the event-setup request. In some embodiments, the payment invitation comprises information exclusively from the event-setup request, and in some embodiments, the invitation comprises information from the event-setup request as well as information from the server, a website, another device, another server or another source (e.g., a logo for the event is included in the invitation from a website).

In some embodiments, providing a payment invitation to each of one or more invitees comprises electing (1210) to invite the first invitee based on membership of the first invitee in a social networking group. For example, either the event organizer, or the server selects invitees to the event (a new dance aerobics fitness class), from members of a social networking group of Zumba enthusiasts.

In some embodiments, providing a payment invitation to each of one or more invitees comprises electing to invite the first invitee based on attendance of the first invitee to a prior event of the event organizer. For example, either the event organizer, or the server selects invitees to the event (a happy hour networking event), from attendees of a prior happy hour networking event. In some embodiments, the prior event was not hosted by the event organizer, but is still relevant to the invitee list for the subsequent event.

In some embodiments, providing a payment invitation to each of one or more invitees comprises electing to invite the first invitee based on one or more criteria specified in the event setup request. For example, the server selects invitees based on an invitee list submitted by the event organizer, or the server selects invitees based on guidelines in the event-setup request (e.g., no invitees under age 21, only invitees from the graduating class of 2014).

The method includes receiving (1212) from at least a first invitee of the one or more invitees, a conditional acceptance to the payment invitation, the acceptance being conditioned on one or more predefined criteria. In some embodiments, the acceptance to the payment session invitation is conditioned (1214) on detecting a first device associated with the first invitee at the subsequent event (e.g., the first invitee agrees to pay if he actually attends the event). In some embodiments, the method further includes determining that the first device is at an event location of the event, for a predetermined amount of time or for any duration of time during an event time of the event. In some embodiments, this determining is performed by checking a parameter on the first device associated with the first invitee, such as a GPS signal, a WiFi signal, a cellular signal, an RFID signal, or by checking that some action was performed by the invitee at the event, such as taking a photo, scanning a code (e.g., bar code or QR code) on the device or checking into a user account or application on the first device. In some embodiments, the method includes, in accordance with the determination, authorizing payment from a payment account associated with the first invitee to the organizer (e.g., if the first invitee is at the event, money that he agreed to pay in his conditional acceptance is transferred from his payment account to a payment account of the event organizer).

In some embodiments, the acceptance to the payment session invitation is conditioned (1216) on detecting a second device associated with a second invitee identified in the conditional acceptance at the subsequent event for any duration of time (or for a predetermined amount of time). For example, the first invitee agrees to pay a certain amount if a famous celebrity (e.g., the second invitee) shows up at the event. In some embodiments, the acceptance is conditioned on both the first invitee and the second invitee attending the event, and in some embodiments, the acceptance is conditioned solely on the attendance of the second invitee (i.e., the first invitee still pays whether he shows up at the event or not, if the celebrity is in attendance). In some embodiments, acceptance is conditioned on certain parameters regarding the second invitee. For example, the second invitee must be in attendance at the event for at least an hour, or the second invitee must be within 10 feet of the first invitee at some point in time during the event. In some embodiments, the second invitee does not have to be an invited guest, or does not have to be invited to the payment session. In some embodiments, the acceptance of the first invitee conditioned on the attendance of the second invitee is coupled with an acceptance to pay a sum of money on behalf of the second invitee (e.g., the first invitee will pay for himself and his love interest if she attends a singles mixer). In some embodiments, the method includes determining that the second device is at an event location of the event, for any duration of time during an event time of the event, and in accordance with the determination, authorizing payment from a payment account associated with the first invitee to the organizer. In some embodiments, determining the attendance of the second invitee is performed in one of the same ways outlined above with respect to determining the attendance of the first invitee.

In some embodiments, the acceptance to the payment session invitation is conditioned on detecting at least a predefined number of attendees at the subsequent event. For example, the first invitee agrees to pay $10 for a party as long as at least 50 people attend it. In some embodiments, the method includes determining that respective devices associated with at least a predefined number of attendees are at an event location of the event, for any duration of time during an event time of the event, and in accordance with the determination, authorizing payment from a payment account associated with the first invitee to the organizer. In some embodiments, the determining is performed by one or more of the methods described above with respect to determining the attendance of the first invitee at the event.

In some embodiments, the method includes monitoring one or more parameters related to the actual attendance of the first invitee at the subsequent event, and authorizing payment from a payment account associated with the first invitee to the organizer in accordance with the one or more predefined criteria being satisfied by the monitored one or more parameters.

In some embodiments, the method includes detecting (1218) forwarding of the payment invitation from a third invitee to a sponsor of the third invitee. For example, a child is sent a payment invitation for a school excursion, and the server detects that the invitation is forwarded to the child's mother. In some embodiments, the method further includes receiving from a device associated with the sponsor, confirmation to make a payment corresponding to the payment invitation on behalf of the second invitee. In the prior example, the server receives a confirmation to pay the amount in the forwarded invitation, on behalf of the child, from a device associated with the child's mother. In some embodiments, the confirmation from the sponsor to pay on behalf of the third invitee is conditioned on one or more predefined criteria related to actual attendance of the third invitee at the subsequent event, or is conditioned on another basis, such as the ones addressed above. In some embodiments, the method further includes monitoring one or more parameters related to the actual attendance of the third invitee at the subsequent event and authorizing payment from a payment account associated with the sponsor of the third invitee to the organizer in accordance with the one or more predefined criteria being satisfied by the monitored one or more parameters related to the actual attendance of the third invitee at the subsequent event.

In some embodiments, a respective invitee to the payment session wishes to pay for another person to attend the event (e.g., as in the prior example, the mother receives the payment invitation for the school excursion, but the mother wishes to pay for her child to attend the event). In some embodiments, the method includes receiving from a respective invitee of the one or more invitees, a conditional acceptance to the payment invitation, where the acceptance is conditioned on one or more predefined criteria related to the actual attendance of a sponsored attendee of the respective invitee at the subsequent event. In some embodiments, the method includes monitoring one or more parameters related to the actual attendance of the sponsored attendee of the respective invitee at the subsequent event and authorizing payment from a payment account associated with the respective invitee to the organizer in accordance with the one or more predefined criteria being satisfied by the monitored one or more parameters related to the actual attendance of the sponsored attendee of the respective invitee at the subsequent event.

In some embodiments, the method includes, after authorizing payment from a payment account associated with a respective invitee to the organizer, receiving a reimbursement request or detecting forwarding of the payment invitation to a reimbursing or sponsoring payment account. For example, an employee attends an educational seminar at the request of her employer, pays for the seminar herself, then forwards the payment invitation, a receipt or another indication of the payment amount, to her employer or manager.

In some embodiments, the payment invitation comprises more than one payment option and the conditional acceptance comprises selection of one or more payment options. For example, the payment invitation allows a respective invitee to pay $5 before the day of the event, or $10 on the day of the event. In another example, the payment invitation allows a respective invitee to pick a payment option that includes a variable or adaptable payment rate, such as paying $15 for a class if 10 people or fewer show up, $10 for the class if more than 10 people show up, or just a flat $12 fee. In another example, the payment invitation includes an option to pay an amount commensurate with the length of time the respective invitee spends at the event, such as $5 per half hour at an unlimited wine-tasting event. In some embodiments, a payment option is dependent on the behavior of the respective invitee (e.g., detecting that the respective invitee mingled with 5 or more people), and in some embodiments, a payment option is dependent on factors external to the respective invitee (e.g., how many other people showed up at the event). In some embodiments, these behaviors or factors are determined through monitoring one or more devices of invitees or attendees at the event.

In some embodiments, the method includes determining that a first, uninvited attendee associated with a respective device is at the location of the event, for any duration of time during the time of the event. In some embodiments, the method further includes, in accordance with the determination, reporting the presence of the first, uninvited device to the event organizer. In some embodiments, the method further includes, in accordance with the determination, authorizing a payment from a payment account associated with the first, uninvited attendee to the organizer.

In some embodiments, the method includes receiving (1222) from a fourth invitee, a rejection of the payment invitation (e.g., the fourth invitee did not conditionally accept the invitation to the event). In some embodiments, the method further includes determining (1224) that a device associated with the fourth invitee is at an event location of the event, for any duration of time during an event time of the event (i.e., that the fourth invitee attended the event despite the rejection of the invitation). In some embodiments, the method further includes, in accordance with the determination, reporting (1226) the presence of the fourth invitee to the event organizer. In some embodiments, the method further includes, in accordance with the determination, authorizing a payment from a payment account associated with the fourth invitee to the organizer.

In some embodiments, the method includes receiving from a fifth invitee, a rejection of the payment invitation, and determining that a device associated with the fifth invitee is turned off or otherwise unable to be monitored, for any duration of time during an event time of the event. In some embodiments, the method further includes, in accordance with the determination, reporting the inability to monitor the device of the fifth invitee to the event organizer. For example, if the method of monitoring the attendance of a respective invitee to an event is by detecting GPS coordinates of a device of the respective invitee during a period of time during the event, the inability to detect the GPS coordinates of the respective invitee that declined the payment invitation is reported to the event organizer, in case the fifth invitee is attempting to defraud the event organizer.

Figure 13A:
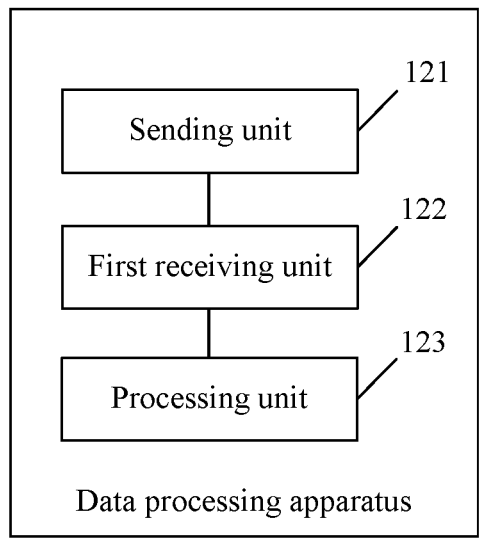
FIG. 13A is a block diagram of a payment-related data processing apparatus according to some embodiments.

FIG. 13A is a schematic structural view of a data processing apparatus according to an embodiment of the present application. As shown in FIG. 13A, the data process apparatus includes: a sending unit 121, a first receiving unit 122 and a processing unit 123.

The sending unit 121 is used for sending a request message including a payment order to a payment terminal, wherein the request message is used for requesting processing the payment order when the payment terminal is at a particular position at a particular time.

In some embodiments, the payment order may be a payment order that the payment terminal applies for, the payment order may be a received payment order sent by another terminal (e.g., a receiving terminal) for inviting the payment terminal to pay, and the payment order also may be a payment order generated actively or the like. In addition, the payment order includes, but is not limited to, payment amount, a receiving account and the like.

The first receiving unit 122 is used for receiving a confirmation message sent by the payment terminal, wherein the confirmation message is used for agreeing that the server processes the payment order when the payment terminal is at the particular position at the particular time.

In some embodiments, the payment terminal may display the request message after receiving the request message. After reading the message, the user may input the confirmation message on the payment terminal, and the payment terminal returns the confirmation message.

The processing unit 123 is used for, in response to the confirmation message, processing the payment order at the particular time, when the payment terminal is at the particular position.

Figure 13B:
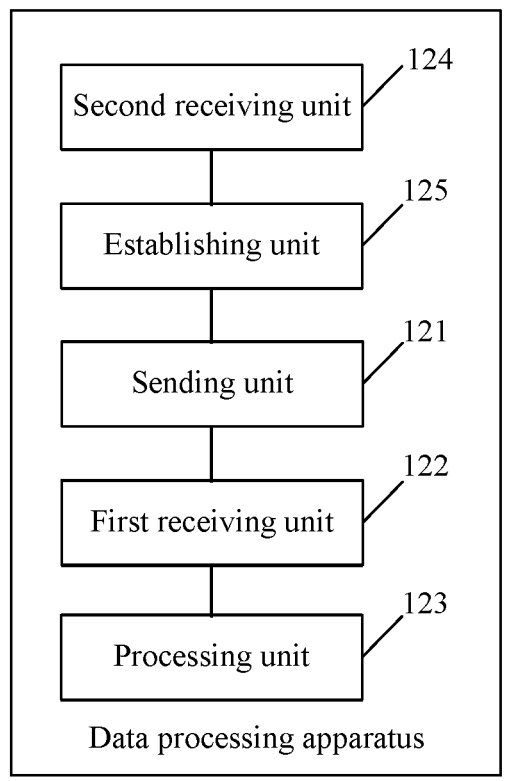
FIG. 13B is a block diagram of another payment-related data processing apparatus according to some embodiments.

In some embodiments, as shown in FIG. 13B, the apparatus may further include: a second receiving unit 124, and an establishing unit 125.

The second receiving unit 124 is for receiving a set message for setting a target activity sent by an initiating terminal, wherein the set message includes: communication account information of the payment terminal, time information indicating the particular time, position information indicating the particular position and the payment order, the set message is used for inviting the payment terminal to participate in the target activity at the particular time and at the particular position, the payment terminal needs to pay the payment order when participating in the target activity, and the payment order includes a receiving account and payment amount.

The establishing unit 125, is for establishing a payment event in response to the set message; wherein the payment event is processing the payment order when the payment terminal is at the particular position at the particular time.

In some embodiments, the initiating terminal may be any terminal in the field of Internet technologies except the payment terminal. Moreover, the target activity may be an outdoor or indoor activity that a user of the payment terminal participates in, for example, a gathering, a dancing party, camping or other group activities. In addition, the payment terminal may refer to one or more payment terminals. That the set message is used for inviting the payment terminal to participate in the target activity at the particular time and at the particular position may be understood as that the set message is used for inviting the user of the payment terminal to participate in the target activity at the particular time and at the particular position. When the user of the payment terminal participates in the target activity at the particular time and at the particular position, that is, when the payment terminal is at the particular position at the particular time, the payment terminal needs to pay the payment order.

In some embodiments, the communication account includes, but is not limited to, an instant messaging account, an e-mail account, a telephone account, a social networking account or the like.

In some embodiments, the payment event may be established after the set message is received. Establishing the payment event may be saving the time information, the position information and the payment order, or may be understood as that the payment event includes the time information, the position information and the payment order.

In some embodiments, the sending unit 121 may be used for sending an invite message for inviting the payment terminal to participate in the target activity to the payment terminal, wherein the invite message further carries the request message.

In some embodiments, the invite message may be used for inviting the user of the payment terminal to participate in the target activity at the particular time and at the particular position. In addition, that the invite message carries the request message may be understood as that content of the invite message includes the request message, for example, the invite message is a text message, and content of the text may include the request message.

In some embodiments, the processing unit 123 may be further used for, in response to the confirmation message, processing the payment order at the particular time, when detecting that the payment terminal is at the particular position according to information sent by the payment terminal.

In some embodiments, the processing unit 123 may be further used for, in response to the confirmation message, at the particular time, receiving geographic information reported by the payment terminal, and when the geographic information indicates that the payment terminal is at the particular position, processing the payment order.

In some embodiments, the processing unit 123 may be further used for, in response to the confirmation message, processing the payment order at the particular time, when detecting that the payment terminal is at the particular position according to a communication account that the payment terminal logs in.

In some embodiments, the processing unit 123 may be further used for, in response to the confirmation message, sending an acknowledgment message for acknowledging payment to the payment terminal at the particular time, when detecting that the payment terminal is at the particular position; receiving a response message returned by the payment terminal according to the acknowledgment message; and processing the payment order according to the response message.

In some embodiments, the apparatus may be applied to a server, for example, a bank server or a transaction server or the like.

The technical solution includes: sending a request message including a payment order to a payment terminal, wherein the request message is used for requesting processing the payment order when the payment terminal is at a particular position at a particular time; receiving a confirmation message sent by the payment terminal, wherein the confirmation message is used for agreeing that the server processes the payment order when the payment terminal is at the particular position at the particular time; and processing the payment order at the particular time, when the payment terminal is at the particular position. So, security of online payment can be improved.

Figure 14:
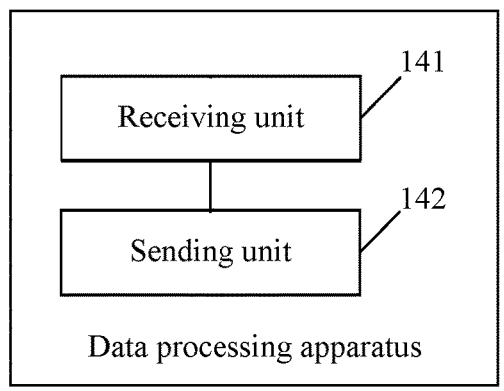
FIG. 14 is a block diagram of a further payment-related data processing apparatus according to some embodiments.

FIG. 14 is a schematic structural view of a further data processing apparatus according to an embodiment of the present application, as shown in FIG. 14, which includes: a receiving unit 141 and a sending unit 142.

The receiving unit 141 is used for receiving a request message including a payment order sent by a server, wherein the request message is used for requesting that the server processes the payment order when the apparatus is at a particular position at a particular time; and The sending unit 142 is used for generating a confirmation message in response to the request message, wherein the confirmation message is used for agreeing that the server processes the payment order when the apparatus is at the particular position at the particular time; sending the confirmation message to the server, so that the server processes the payment order when the apparatus is at the particular position at the particular time.

In some embodiments, after the server receives the confirmation message, the server processes the payment order when the apparatus is at the particular position at the particular time.

In some embodiments, the apparatus may be applied to the payment terminal introduced in the above embodiments, for example, a tablet computer, a mobile phone, an e-reader, a remote control, a PC, a notebook, an on-board device, a network television, a wearable device or other smart devices with a network function.

In the technical solution, the apparatus receives a request message including a payment order sent by a server, wherein the request message is used for requesting processing the payment order when the apparatus is at a particular position at a particular time; the apparatus generates a confirmation message in response to the request message, wherein the confirmation message is used for agreeing that the server processes the payment order when the apparatus is at the particular position at the particular time; and the apparatus sends the confirmation message to the server, so that the server processes the payment order when the apparatus is at the particular position at the particular time. So, payment security can be improved.

Figure 15:
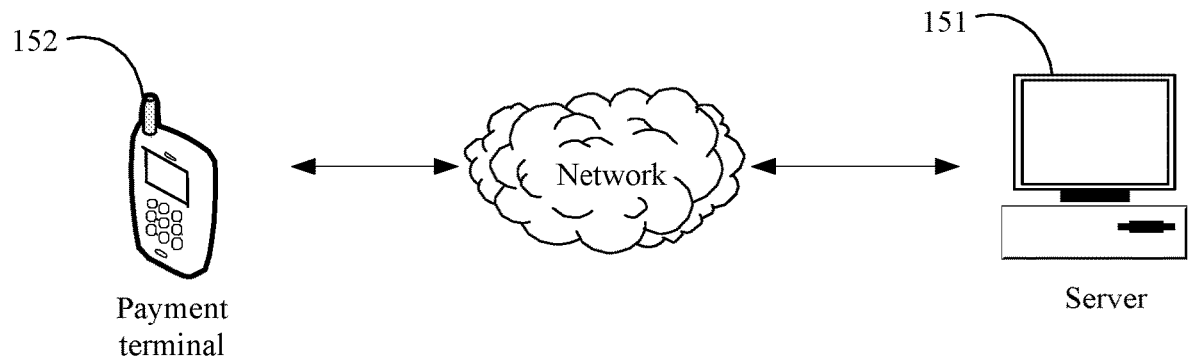
FIG. 15 is a block diagram of a further payment-related data processing system according to some embodiments.

FIG. 15 is a schematic structural view of a further data processing system according to an embodiment of the present application. As shown in FIG. 15, the data processing system includes: a payment terminal 151 and a server 152.

The payment terminal 151 is used for sending a set message for setting a payment event to the server 152, wherein the set message includes: time information indicating a particular time, position information indicating a particular position and a payment order, and the payment event is processing the payment order when the payment terminal is at the particular position at the particular time; and The server 152 is used for establishing the payment event; and in response to the payment event, processing the payment order at the particular time, when the payment terminal 151 is at the particular position.

In some embodiments, the payment order may include a payment account and payment amount, and also may include a receiving account and the like.

In some embodiments, the server 152 may establish the payment event after receiving the set message. That the server 152 establishes the payment event may be saving the time information, the position information and the payment order, or may be understood as that the payment event includes the time information, the position information and the payment order.

In some embodiments, the server 152 also may pre-acquire a payment account bound to the payment terminal 151, and authentication information of the payment account. For example, the payment terminal 151 pre-binds a payment account and authentication information of the payment account on the server 152. So, after the server 152 receives the confirmation message and when at the particular time, the payment terminal 151 is at the particular position, the server 152 can process the payment order for the payment account according to the authentication information of the payment account.

In some embodiments, the server 152 may be further used for receiving a payment account and authentication information sent by the payment terminal 151.

In some embodiments, the server 152 may be further used for, in response to the payment event, processing the payment order at the particular time, when detecting that the payment terminal 151 is at the particular position according to information sent by the payment terminal 151.

In some embodiments, the server 152 may be further used for, in response to the payment event, at the particular time, receiving geographic information reported by the payment terminal 151, and when the geographic information indicates that the payment terminal 151 is at the particular position, processing the payment order.

In some embodiments, the server 152 may be further used for, in response to the payment event, processing the payment order at the particular time, when detecting that the payment terminal 151 is at the particular position according to a communication account that the payment terminal 151 logs in.

In some embodiments, the server 152 may be further used for, in response to the payment event, sending an acknowledgment message for acknowledging payment to the payment terminal 151 at the particular time, when detecting that the payment terminal 151 is at the particular position; the payment terminal 151 may be further used for returning a response message to the server 152 according to the acknowledgment message; and the server 152 may be further used for processing the payment order according to the response message.

It can achieve through the above system completion of quick fixed-time fixed-position payment for the payment terminal 151, for example, the payment terminal 151 has some payment events in particular positions at particular times, for example, pay the rent, take a bus, pay a mortgage and the like. In this way, as long as the payment terminal 151 pre-sends the set message to the server 152, payment is directly completed when it reaches the particular time and the particular position of the payment, so as to improve convenience of the payment.

In some embodiments, the payment terminal 151 is any device with a communication function, for example, a tablet computer, a mobile phone, an e-reader, a remote control, a PC, a notebook, an on-board device, a network television, a wearable device or other smart devices with a network function.

In the technical solution, a payment terminal sends a set message for setting a payment event to a server; the server establishes the payment event; and at the particular time, when the payment terminal is at the particular position, the server processes the payment order. In this way, it can achieve that the payment order is processed only after the payment terminal returns a confirmation message and when at the particular time, the payment terminal is at the particular position, so that payment security can be improved.

Figure 16:
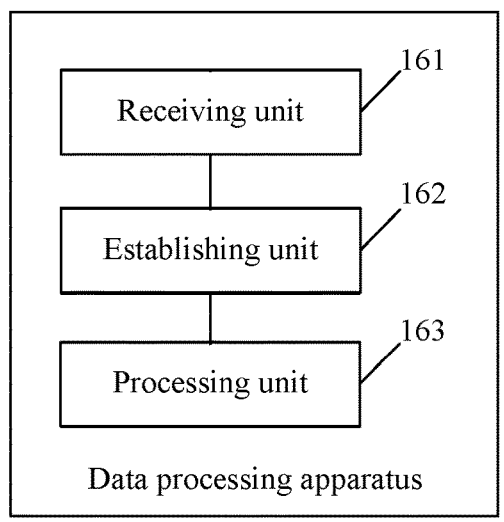
FIG. 16 is a block diagram of a yet another payment-related data processing apparatus according to some embodiments.

FIG. 16 is a schematic structural view of a yet another data processing apparatus according to an embodiment of the present application. As shown in FIG. 16, the data processing apparatus includes: a receiving unit 161, an establishing unit 162 and a processing unit 163.

The receiving unit 161 is used for receiving a set message for setting a payment event sent by a payment terminal, wherein the set message includes: time information indicating a particular time, position information indicating a particular position and a payment order, and the payment event is processing the payment order when the payment terminal is at the particular position at the particular time.

In some embodiments, the payment order may include a payment account and payment amount, and also may include a receiving account and the like.

The establishing unit 162 is used for establishing the payment event.

In some embodiments, the establishing unit 162 may establish the payment event after receiving the set message. Establishing the payment event may be saving the time information, the position information and the payment order, or may be understood as that the payment event includes the time information, the position information and the payment order.

The processing unit 163 is used for, in response to the payment event, processing the payment order at the particular time, when the payment terminal is at the particular position.

In some embodiments, the processing unit 163 may be used for, in response to the payment event, processing the payment order at the particular time, when detecting that the payment terminal is at the particular position.

In some embodiments, the processing unit 163 may be used for, in response to the payment event, processing the payment order at the particular time, when detecting that the payment terminal is at the particular position according to information sent by the payment terminal.

In some embodiments, the processing unit 163 may be used for, in response to the payment event, at the particular time, receiving geographic information reported by the payment terminal, and when the geographic information indicates that the payment terminal is at the particular position, processing the payment order.

In some embodiments, the processing unit 163 may be used for, in response to the payment event, processing the payment order at the particular time, when detecting that the payment terminal is at the particular position according to a communication account that the payment terminal logs in.

In some embodiments, the processing unit 163 may be used for, in response to the payment event, sending an acknowledgment message for acknowledging payment to the payment terminal at the particular time, when detecting that the payment terminal is at the particular position; receiving a response message returned by the payment terminal according to the acknowledgment message; and processing the payment order according to the response message.

In some embodiments, the apparatus may be applied to a server, for example, a bank server or a transaction server or the like.

The technical solution includes: receiving a set message for setting a payment event sent by a payment terminal; establishing the payment event; and processing the payment order at the particular time, when the payment terminal is at the particular position. So, security of online payment can be improved.

Figure 17:
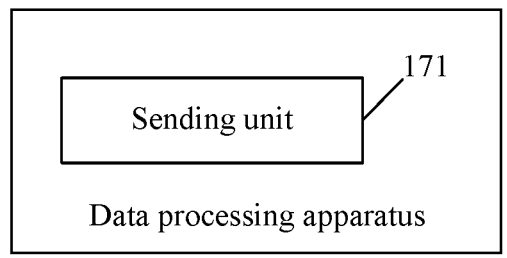
FIG. 17 is a block diagram of another payment-related data processing apparatus according to some embodiments.

FIG. 17 is a schematic structural view of another data processing apparatus according to an embodiment of the present application. As shown in FIG. 17, the data processing apparatus includes: a sending unit 171.

The sending unit 171 is used for sending a set message for setting a payment event to the server, wherein the set message includes: time information indicating a particular time, position information indicating a particular position and a payment order, the payment event is that the server processes the payment order when the data processing apparatus is at the particular position at the particular time, so that the server establishes the payment event; and at the particular time, when the data processing apparatus is at the particular position, the server processes the payment order.

In some embodiments, the payment order may include a payment account and payment amount, and also may include a receiving account and the like.

In some embodiments, after the server receives the confirmation message, the server processes the payment order when at the particular time, the payment terminal is at the particular position.

In some embodiments, the data processing apparatus may be used in any device with a communication function, for example, a tablet computer, a mobile phone, an e-reader, a remote control, a PC, a notebook, an on-board device, a network television, a wearable device or other smart devices with a network function.

In the technical solution, a data processing apparatus sends a set message for setting a payment event to the server, wherein the set message includes: time information indicating a particular time, position information indicating a particular position and a payment order, the payment event is processing the payment order when the data processing apparatus is at the particular position at the particular time, so that the server establishes the payment event; and at the particular time, when the data processing apparatus is at the particular position, the server processes the payment order. So, payment security can be improved.

Figure 18:
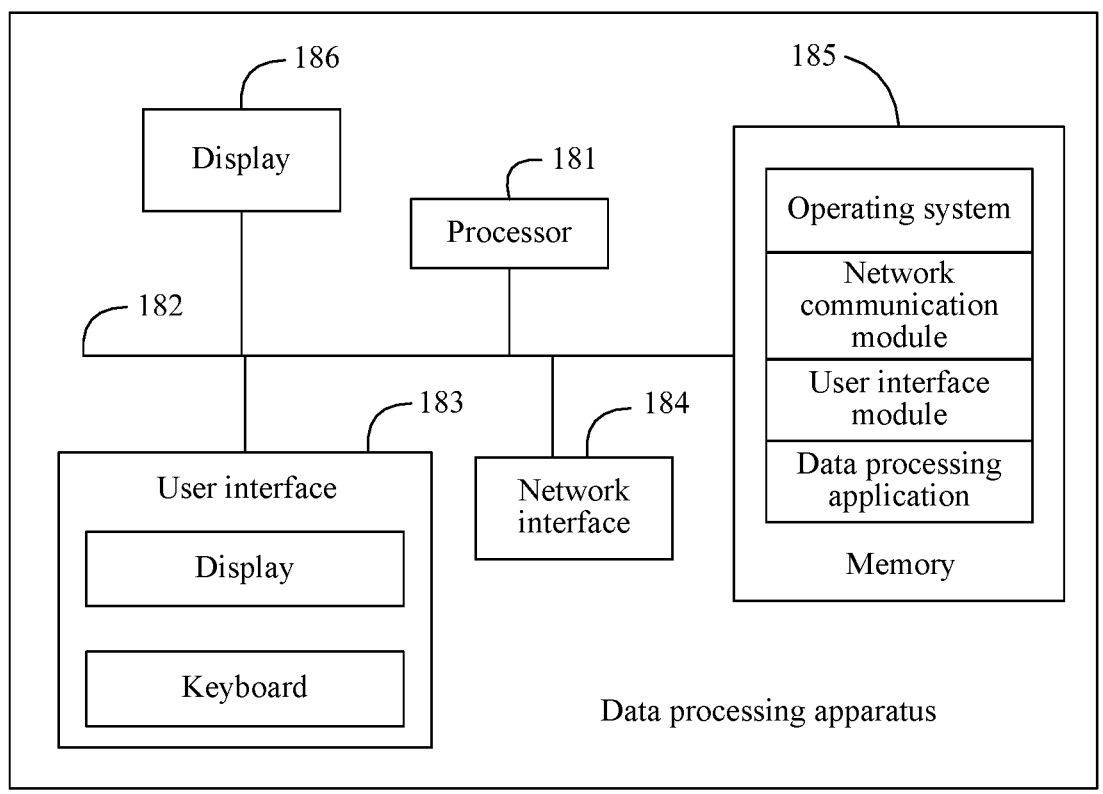
FIG. 18 is a block diagram of a further payment-related data processing apparatus according to some embodiments.

FIG. 18 is a schematic structural view of a further data processing apparatus according to an embodiment of the present application, as shown in FIG. 18, which includes: at least one processor 181, for example, CPU, at least one network interface 184, a user interface 183, a memory 185 and at least one communication bus 182. The communication bus 182 is used for implementing connections and communications between the components. The user interface 183 may include a Display and a Keyboard. In some embodiments, the user interface 183 also may include standard wired interfaces and wireless interfaces. The network interface 184 may include standard wired interfaces and wireless interfaces (e.g., WI-FI interfaces). The memory 185 may be a high-speed RAM memory, or may be a non-volatile memory, for example, at least one magnetic disk memory. The memory 185 alternatively also may be at least one storage device located away from the processor 181. As shown in FIG. 18, the memory 185, as a computer storage medium, may include an operating system, a network communication module, a user interface module and a data processing application.

In the data processing apparatus shown in FIG. 18, the network interface 184 is mainly used for connecting a terminal, and conducting data communication with the terminal; and the processor 181 may be used for calling the data processing application stored in the memory 185, and executing the following operations: sending a request message including a payment order to a payment terminal through the network interface 184, wherein the request message is used for requesting processing the payment order when the payment terminal is at a particular position at a particular time; receiving a confirmation message sent by the payment terminal through the network interface 184, wherein the confirmation message is used for agreeing that the server processes the payment order when the payment terminal is at the particular position at the particular time; and in response to the confirmation message, processing the payment order at the particular time, when the payment terminal is at the particular position.

In some embodiments, the processor 181, before executing the operation of sending a request message including a payment order to a payment terminal through the network interface 184, also may be used for execute the following operations: receiving a set message for setting a target activity sent by an initiating terminal through the network interface 184, wherein the set message includes: communication account information of the payment terminal, time information indicating the particular time, position information indicating the particular position and the payment order, the set message is used for inviting the payment terminal to participate in the target activity at the particular time and at the particular position, the payment terminal needs to pay the payment order when participating in the target activity, and the payment order includes a receiving account and payment amount; and establishing a payment event in response to the set message; wherein the payment event is processing the payment order when the payment terminal is at the particular position at the particular time.

In some embodiments, the initiating terminal may be any terminal in the field of Internet technologies except the payment terminal. Moreover, the target activity may be an outdoor or indoor activity that a user of the payment terminal participates in, for example, a gathering, a dancing party, camping or other group activities. In addition, the payment terminal may refer to one or more payment terminals. That the set message is used for inviting the payment terminal to participate in the target activity at the particular time and at the particular position may be understood as that the set message is used for inviting the user of the payment terminal to participate in the target activity at the particular time and at the particular position. When the user of the payment terminal participates in the target activity at the particular time and at the particular position, that is, when the payment terminal is at the particular position at the particular time, the payment terminal needs to pay the payment order.

In some embodiments, the communication account includes, but is not limited to, an instant messaging account, an e-mail account, a telephone account, a social networking account or the like.

In some embodiments, the payment event may be established after the set message is received. Establishing the payment event may be saving the time information, the position information and the payment order, or may be understood as that the payment event includes the time information, the position information and the payment order.

In some embodiments, that the processor 181 executes the operation of sending a request message including a payment order to a payment terminal through the network interface 184 may include: sending an invite message for inviting the payment terminal to participate in the target activity to the payment terminal through the network interface 184, wherein the invite message further carries the request message.

In some embodiments, the apparatus pre-acquires a payment account bound to the payment terminal, and authentication information of the payment account.

In some embodiments, the processor 181 may be further used for executing the following operation: receiving a payment account and authentication information sent by the payment terminal through the network interface 184.

In some embodiments, that the processor 181 executes the operation of processing the payment order at the particular time, when the payment terminal is at the particular position may include: processing the payment order at the particular time, when detecting that the payment terminal is at the particular position according to information sent by the payment terminal; or at the particular time, receiving geographic information reported by the payment terminal, and when the geographic information indicates that the payment terminal is at the particular position, processing the payment order; or processing the payment order at the particular time, when detecting that the payment terminal is at the particular position according to a communication account that the payment terminal logs in.

In some embodiments, that the processor 181 executes the operation of processing the payment order at the particular time, when the payment terminal is at the particular position may include: sending an acknowledgment message for acknowledging payment to the payment terminal at the particular time, when detecting that the payment terminal is at the particular position; receiving a response message returned by the payment terminal according to the acknowledgment message; and processing the payment order according to the response message.

In implementation, when the payment terminal is at the particular position at the particular time, the acknowledgment message is sent to the payment terminal, and the payment order is processed only when the response message is received. In this way, payment security can be further improved.

In some embodiments, the apparatus specifically may be applied to a server, for example, a transaction platform server or a bank server or the like.

The technical solution includes: sending a request message including a payment order to a payment terminal, wherein the request message is used for requesting processing the payment order when the payment terminal is at a particular position at a particular time; receiving a confirmation message sent by the payment terminal, wherein the confirmation message is used for agreeing that the server processes the payment order when the payment terminal is at the particular position at the particular time; and processing the payment order at the particular time, when the payment terminal is at the particular position. So, security of online payment can be improved.

FIG. 18 is a schematic structural view of another data processing apparatus according to an embodiment of the present application.

In this embodiment, in the data processing apparatus shown in FIG. 18, the network interface 184 is mainly used for connecting a server, and conducting data communication with the server; and the processor 181 may be used for calling the data processing application stored in the memory 185, and executing the following operations: receiving a request message including a payment order sent by a server through the network interface 184, wherein the request message is used for requesting that the server processes the payment order when the data processing apparatus is at a particular position at a particular time; generating a confirmation message in response to the request message through the user interface 183, wherein the confirmation message is used for agreeing that the server processes the payment order when the data processing apparatus is at the particular position at the particular time; and sending the confirmation message to the server through the network interface 184, so that the server, at the particular time, when the data processing apparatus is at the particular position, processes the payment order.

In some embodiments, after the server receives the confirmation message, the server processes the payment order when at the particular time, the payment terminal is at the particular position.

In some embodiments, the data processing apparatus is applied to any device with a communication function, for example, a tablet computer, a mobile phone, an e-reader, a remote control, a PC, a notebook, an on-board device, a network television, a wearable device or other smart devices with a network function.

The technical solution includes: receiving a request message including a payment order sent by a server, wherein the request message is used for requesting that the server processes the payment order when the data processing apparatus is at a particular position at a particular time; generating a confirmation message in response to the request message, wherein the confirmation message is used for agreeing that the server processes the payment order when the data processing apparatus is at the particular position at the particular time; and sending the confirmation message to the server, so that the server, at the particular time, when the data processing apparatus is at the particular position, processes the payment order. So, payment security can be improved.

FIG. 18 also may be a schematic structural view of a further data processing apparatus according to an embodiment of the present application.

In this embodiment, in the data processing apparatus shown in FIG. 18, the network interface 184 is mainly used for connecting a terminal, and conducting data communication with the terminal; and the processor 181 may be used for calling the data processing application stored in the memory 185, and executing the following operations: receiving a set message for setting a payment event sent by a payment terminal through the network interface 184, wherein the set message includes: time information indicating a particular time, position information indicating a particular position and a payment order, and the payment event is processing the payment order when the payment terminal is at the particular position at the particular time; establishing the payment event; and in response to the payment event, processing the payment order at the particular time, when the payment terminal is at the particular position.

In some embodiments, the payment order may include a payment account and payment amount, and also may include a receiving account and the like.

In some embodiments, the payment event may be established after the set message is received. Establishing the payment event may be saving the time information, the position information and the payment order, or may be understood as that the payment event includes the time information, the position information and the payment order.

In some embodiments, that the processor 181 executes the operation of processing the payment order at the particular time, when the payment terminal is at the particular position may include: processing the payment order at the particular time, when detecting that the payment terminal is at the particular position.

In some embodiments, that the processor 181 executes the operation of processing the payment order at the particular time, when the payment terminal is at the particular position may include: processing the payment order at the particular time, when detecting that the payment terminal is at the particular position according to information sent by the payment terminal.

In some embodiments, that the processor 181 executes the operation of processing the payment order at the particular time, when the payment terminal is at the particular position may include: at the particular time, receiving geographic information reported by the payment terminal, and when the geographic information indicates that the payment terminal is at the particular position, processing the payment order.

In some embodiments, that the processor 181 executes the operation of processing the payment order at the particular time, when the payment terminal is at the particular position may include: processing the payment order at the particular time, when detecting that the payment terminal is at the particular position according to a communication account that the payment terminal logs in.

In some embodiments, that the processor 181 executes the operation of processing the payment order at the particular time, when the payment terminal is at the particular position may include: sending an acknowledgment message for acknowledging payment to the payment terminal at the particular time, when detecting that the payment terminal is at the particular position; receiving a response message returned by the payment terminal according to the acknowledgment message; and processing the payment order according to the response message.

In implementation, when the payment terminal is at the particular position at the particular time, the acknowledgment message is sent to the payment terminal, and the payment order is processed only when the response message is received. In this way, payment security can be further improved.

In some embodiments, the apparatus specifically may be applied to a server, for example, a transaction platform server or a bank server or the like.

The technical solution includes: receiving a set message for setting a payment event sent by a payment terminal; establishing the payment event; and processing the payment order at the particular time, when the payment terminal is at the particular position. So, security of online payment can be improved.

FIG. 18 also may be a schematic structural view of a yet another data processing apparatus according to an embodiment of the present application.

In this embodiment, in the data processing apparatus shown in FIG. 18, the network interface 184 is mainly used for connecting a server, and conducting data communication with the server; and the processor 181 may be used for calling the data processing application stored in the memory 185, and executing the following operations: sending a set message for setting a payment event to the server through the network interface 184, wherein the set message includes: time information indicating a particular time, position information indicating a particular position and a payment order, and the payment event is that the server processes the payment order when the payment terminal is at the particular position at the particular time, so that the server establishes the payment event; and at the particular time, when the payment terminal is at the particular position, the server processes the payment order.

In some embodiments, the payment order may include a payment account and payment amount, and also may include a receiving account and the like.

In some embodiments, after the server receives the confirmation message, the server processes the payment order when at the particular time, the payment terminal is at the particular position.

In some embodiments, the data processing apparatus is applied to any device with a communication function, for example, a tablet computer, a mobile phone, an e-reader, a remote control, a PC, a notebook, an on-board device, a network television, a wearable device or other smart devices with a network function.

Figure 19:
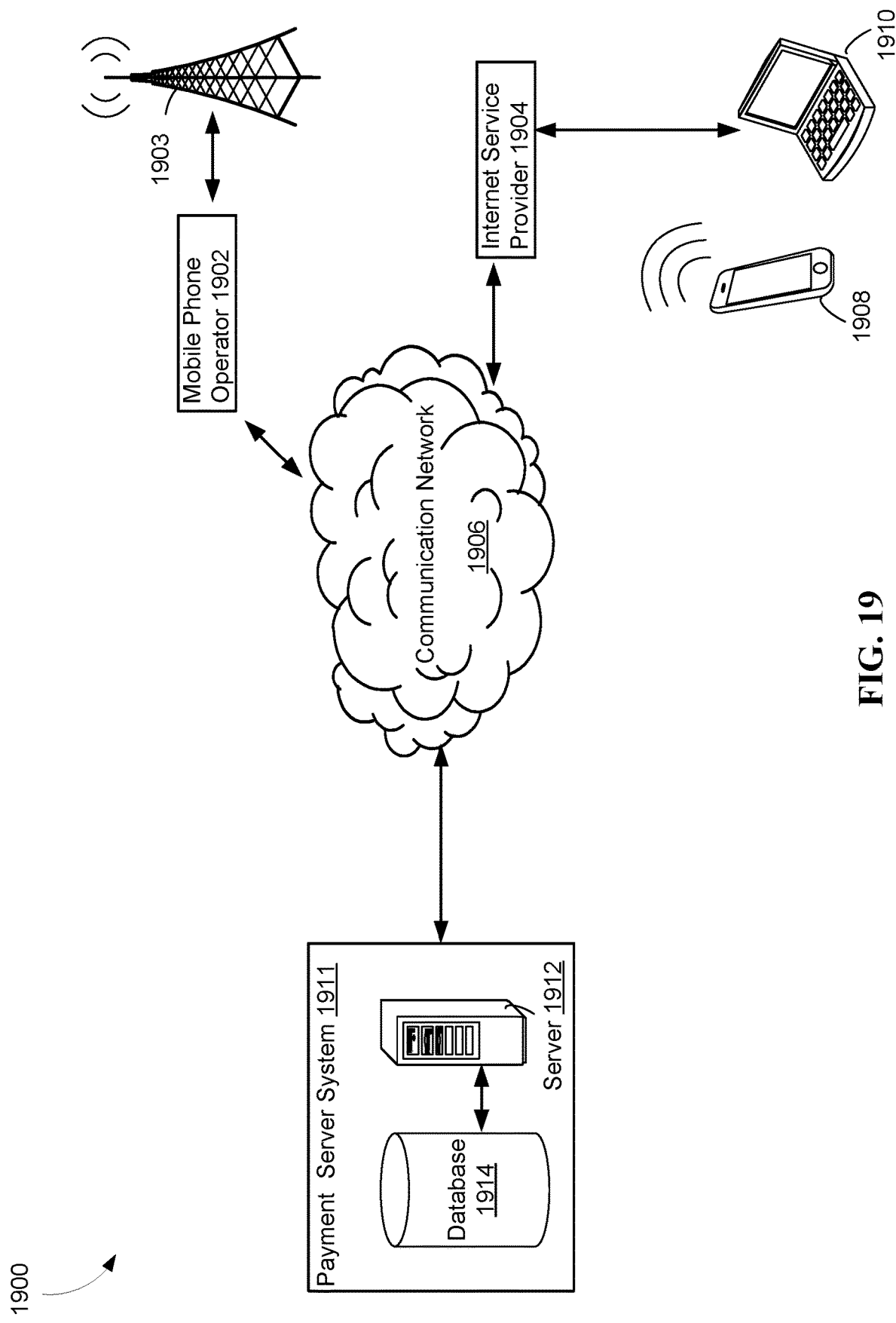
FIG. 19 is a block diagram of a client-server environment for authorizing a payment transaction in accordance with some embodiments.

FIG. 19 is a diagram of a client-server environment 1900 for facilitating a payment transaction, in accordance with some embodiments of the present application. While certain specific features are illustrated, those skilled in the art will appreciate from the present disclosure that various other features have not been illustrated for the sake of brevity and so as not to obscure more pertinent aspects of the implementations disclosed herein. To that end, the client-server environment 1900 includes one or more mobile phone operators 1902, one or more internet service providers 1904, and a communications network 1906.

The mobile phone operator 1902 (e.g., wireless carrier), and the Internet service provider 1904 are capable of being connected to the communication network 1906 in order to exchange information with one another and/or other devices and systems. Additionally, the mobile phone operator 1902 and the Internet service provider 1904 are operable to connect client devices to the communication network 1906 as well. For example, a smart phone 1908 is operable with the network of the mobile phone operator 1902, which includes for example, a base station 1903. Similarly, for example, a laptop computer 1910 (or tablet, desktop, smart television, workstation or the like) is connectable to the network provided by an Internet service provider 1904, which is ultimately connectable to the communication network 1906.

The communication network 1906 may be any combination of wired and wireless local area network (LAN) and/or wide area network (WAN), such as an intranet, an extranet, including a portion of the Internet. It is sufficient that the communication network 1906 provides communication capability between client devices (e.g., smart phones 1908 and personal computers 1910) and servers. In some implementations, the communication network 1906 uses the HyperText Transport Protocol (HTTP) to transport information using the Transmission Control Protocol/Internet Protocol (TCP/IP). HTTP permits a client device to access various resources available via the communication network 1906. However, the various implementations described herein are not limited to the use of any particular protocol.

In some implementations, the client-server environment 1900 further includes a payment server system 1911. Within the payment server system 1911, there is a server computer 1912 (e.g., a network server such as a web server) for receiving and processing data received from one or more client devices 1908/1910 (e.g., an event-setup request from the device of an event organizer, or a payment invitation to the device of an invitee). In some implementations, the payment server system 1911 stores (e.g., in a database 1914) and maintains payment profile information (e.g., credit card numbers, or bank account information) corresponding to one or more user accounts for users of client devices 1908/1910 or an application running on client devices 1908/1910. In some embodiments, the payment server system 1911 is part of a general social networking system, general mobile payment system, general mobile banking/finance system or a general e-commerce system.

In some implementations, the payment server system 1911 sends and receives various communications to and from a client device 1908/1910. In some embodiments, these communications or the information in these communications are stored and retrieved from database 1914. In some embodiments, the payment server system 1911 receives an event-setup request, from an event organizer (e.g., a user) of a client device 1908/1910 and in some embodiments, the payment server system 1911 sets up the event-based payment session in accordance with the event-setup request, provides a payment invitation corresponding to the payment session to one or more invitees of an event, and receives a conditional acceptance to the payment invitation.

Those skilled in the art will appreciate from the present disclosure that any number of such devices and/or systems may be provided in a client-server environment, and particular devices may be altogether absent. In other words, the client-server environment 1900 is merely an example provided to discuss more pertinent features of the present disclosure. Additional server systems, such as domain name servers and client distribution networks may be present in the client-server environment 1900, but have been omitted for ease of explanation.

Figure 20:
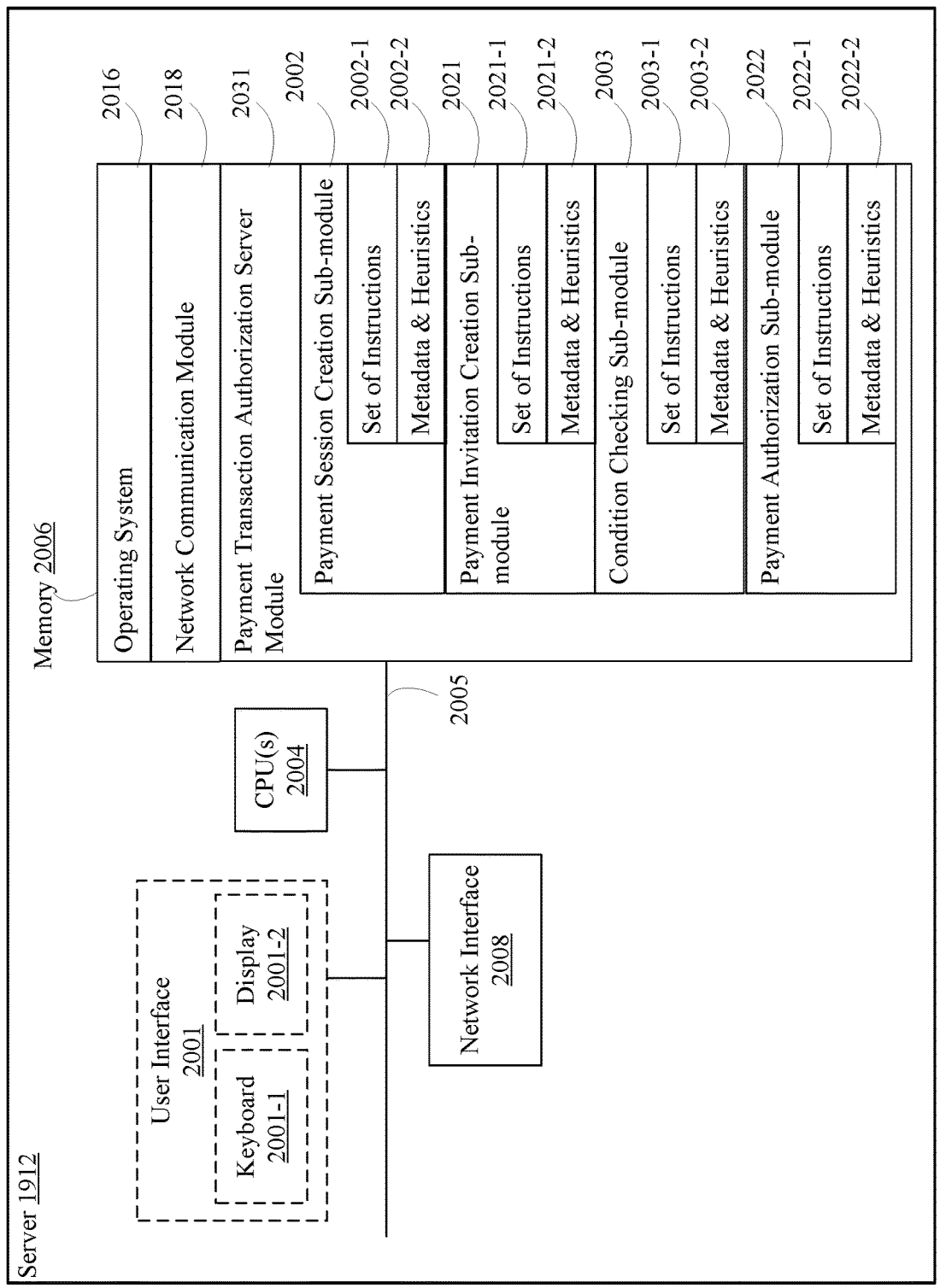
FIG. 20 is a block diagram of an exemplary server for authorizing a payment transaction in accordance with some embodiments.

FIG. 20 is a diagram of an example implementation of the payment server 1912, in accordance with some implementations of the present application. While certain specific features are illustrated, those skilled in the art will appreciate from the present disclosure that various other features have not been illustrated for the sake of brevity and so as not to obscure more pertinent aspects of the implementations disclosed herein.

Server 1912 includes one or more processing units (CPU's) 2004, one or more network or other communications interfaces 2008, an optional user interface 2001 (optionally comprising elements such as a keyboard 2001-1 or display 2001-2), memory 2006, and one or more communication buses 2005 for interconnecting these and various other components. The communication buses 2005 may include circuitry (sometimes called a chipset) that interconnects and controls communications between system components. Memory 2006 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 2006 may optionally include one or more storage devices remotely located from the CPU(s) 2004. Memory 2006, including the non-volatile and volatile memory device(s) within memory 2006, comprises a non-transitory computer readable storage medium.

In some implementations, memory 2006 or the non-transitory computer readable storage medium of memory 2006 stores the following programs, modules and data structures, or a subset thereof including an operating system 2016, a network communication module 2018, and a payment transaction authorization server module 2031.

The operating system 2016 includes procedures for handling various basic system services and for performing hardware dependent tasks.

The network communication module 2018 facilitates communication with other devices via the one or more communication network interfaces 2008 (wired or wireless) and one or more communication networks, such as the internet, other wide area networks, local area networks, metropolitan area networks, and so on.

In some implementations, the payment transaction authorization server module 2031 includes a payment session creation sub-module 2002 for receiving an event-setup request from an event organizer to set up an event-based payment session to obtain payments for one or more attendees of a subsequent event, and setting up the event-based payment session in accordance with the event-setup request. To this end, the payment session creation sub-module 2002 includes a set of instructions 2002-1 and, optionally, metadata 2002-2. In some implementations, the payment transaction authorization server module 2031 includes a payment invitation creation sub-module 2021 having a set of instructions 2021-1 (e.g., to create and send out a payment invitation corresponding to the payment session) and, optionally, metadata 2021-2, as well as a condition checking sub-module 2003 having a set of instructions 2003-1 (e.g., for setting up conditions for payment and checking whether such conditions have been met) and optionally metadata 2003-2. In some implementations, the payment transaction authorization server module 2031 includes a payment authorization sub-module 2022 having a set of instructions 2022-1 (e.g., for authorizing payment from a user account to the event organizer) and, optionally, metadata 2022-2. In some embodiments, the payment transaction authorization server module also includes other modules to perform the functions of the server described with respect to FIGS. 1-12B.

Figure 21:
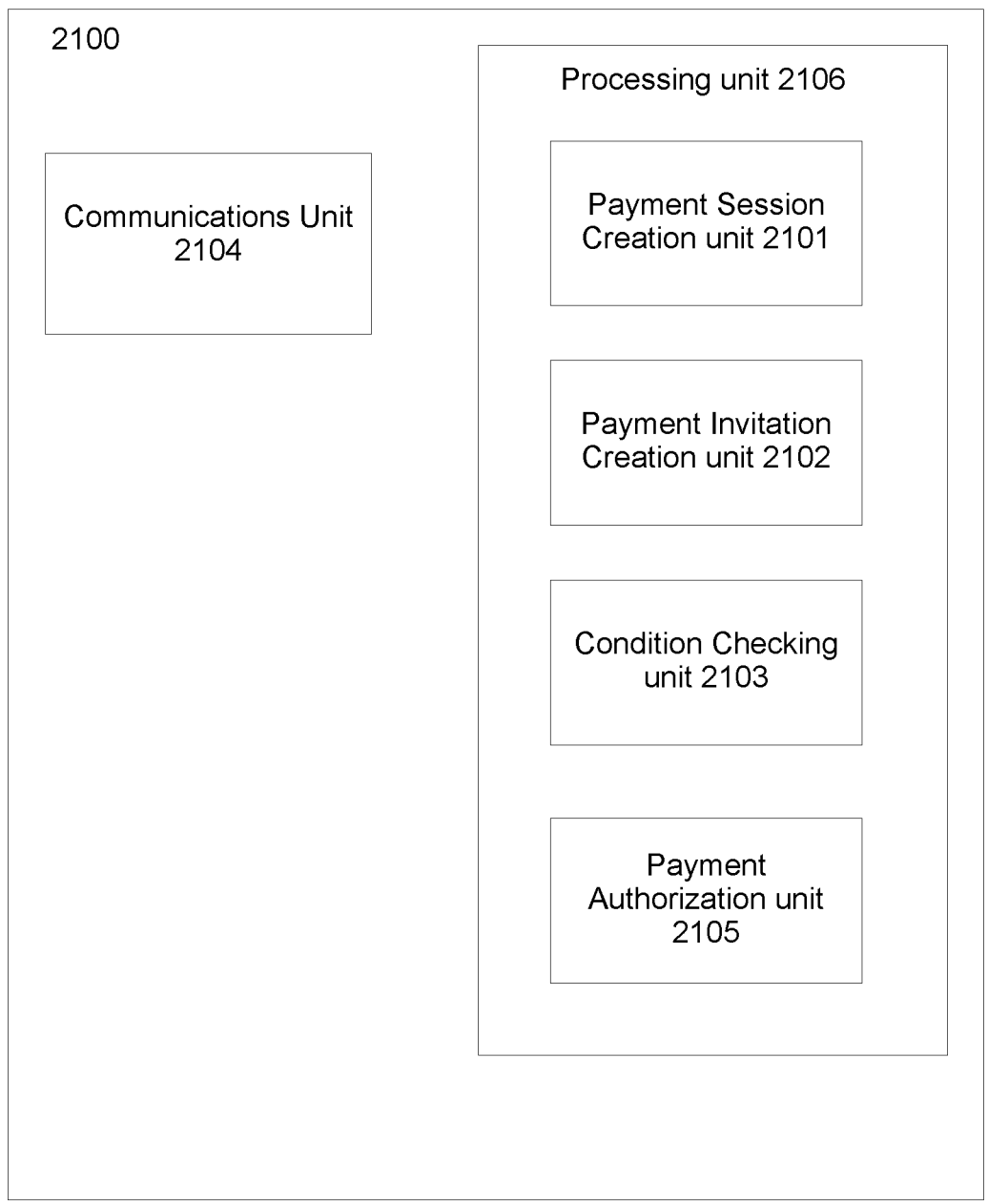
FIG. 21 is a block diagram of an apparatus of authorizing a payment transaction in accordance with some embodiments.

FIG. 21 is a block diagram of a realization apparatus 2100 of authorizing a payment transaction in accordance with some implementations of the present application.

As is shown in FIG. 21, this device includes: a communications unit 2104, and a processing unit 2106 comprising a payment session creation unit 2101, payment invitation creation unit 2102, condition checking unit 2103, and payment authorization unit 2105, among which:

Payment session creation unit 2101: configured to receive an event-setup request from an event organizer (e.g., via a client device 1908/1910) to set up an event-based payment session to obtain payments for one or more attendees of a subsequent event, and setting up the event-based payment session in accordance with the event-setup request;

Payment invitation creation unit 2102: configured to create and send out a payment invitation corresponding to the payment session;

Condition checking unit 2103: configured to set up conditions for payment and checking whether such conditions have been met;

Payment authorization unit 2105: configured to authorize payment from a user account to the event organizer; and Communications unit 2104 is configured to send and receive communications (e.g., server 1912 to and from client device 1908/1910).

In some embodiments, the payment authorization unit also includes other sub-units to perform the functions of the server described with respect to FIGS. 1-12B.

It is acceptable to integrate the device shown in FIG. 21 into hardware entities of a variety of networks. For example, the realization device for payment transaction authorization is allowed to be integrated into: server systems including mainframes, PC computers, portable electronic devices, commercial/enterprise servers etc.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of facilitating a payment transaction, comprising:
   at a server of a social network platform, the server having one or more processors, and memory for storing programs to be executed by the one or more processors:
      receiving an event-setup request from an event organizer to set up an event-based payment session to obtain payments for one or more attendees of a subsequent event, wherein: (i) the event organizer and the one or more attendees are users of the social network platform, (ii) the one or more attendees are contacts of the event organizer in the social network platform, and (iii) the event-setup request includes an event time and a location of the subsequent event;
      in response to receiving the event set-up request:
         setting up the event-based payment session in accordance with the event-setup request; and
         providing, via a message using the social network platform, a payment invitation corresponding to the event-based payment session to each of one or more invitees of the subsequent event in accordance with the event-setup request, wherein the payment invitation includes a plurality of payment options;
      receiving from at least a first invitee of the one or more invitees, (i) a selection of one of the plurality of payment options and (ii) a conditional acceptance to the payment invitation, the conditional acceptance being conditioned on detecting that a first device associated with the first invitee and a second device associated with a second invitee of the one or more invitees, distinct from the first invitee, are both present at an event location of the subsequent event for at least a predefined duration of time during an event time of the subsequent event and the first device is within a predefined distance from the second device for at least one certain point in time during the predefined duration of time;
      determining that (i) the first device and the second device are both present at the event location of the subsequent event, and (ii) the first device and the second device both stay at the event location for at least the predefined duration of time during the event time of the subsequent event and the first device is within the predefined distance from the second device for the at least one certain point in time during the predefined duration of time; and
      in accordance with the determining that (i) the first device and the second device are both present at the event location of the subsequent event, and (ii) the first device and the second device both stay at the event location for at least the predefined duration of time during the event time of the subsequent event and the first device is within the predefined distance from the second device for the at least one certain point in time during the predefined duration of time, authorizing payment from a payment account associated with the first invitee to the organizer according to the selected payment option.

2. The method of claim 1, wherein the event-setup request comprises an event invitation message composed by the event organizer and addressed to one or more social network contacts of the event organizer, and wherein the payment invitation comprises the event invitation message.

3. The method of claim 1, wherein the conditional acceptance to the payment invitation is further conditioned on detecting at least a predefined number of attendees at the subsequent event, and the method further comprises:
   determining that respective devices associated with the at least a predefined number of attendees is at the event location of the subsequent event for at least the predefined duration of time during the event time of the subsequent event; and
   in accordance with the determining that the respective devices associated with the at least the predefined number of attendees is at the event location of the subsequent event for at least the predefined duration of time during the event time of the subsequent event, authorizing payment from the payment account associated with the first invitee to the organizer.

4. The method of claim 1, wherein providing a payment invitation to each of the one or more invitees comprises:
   electing to invite the first invitee based on membership of the first invitee in a social networking group of the social network platform.

5. The method of claim 1, further comprising:
   detecting forwarding of the payment invitation from an invitee of the one or more invitees to a sponsor of the invitee; and
   receiving from a device associated with the sponsor, confirmation to make a payment corresponding to the payment invitation on behalf of the invitee.

6. The method of claim 1, further comprising:
   receiving from a respective invitee of the one or more invitees, a rejection of the payment invitation;
   determining that (i) a device associated with the respective invitee is present at the event location of the subsequent event, and (ii) the device stays at the event location for at least the predefined duration of time during the event time of the subsequent event; and
   in accordance with the determining, reporting the presence of the respective invitee to the event organizer.

7. A social network platform server, comprising:
   one or more processors;
   memory having instructions stored thereon, the instructions, when executed by the one or more processors, cause the processors to perform operations comprising:
      receiving an event-setup request from an event organizer to set up an event-based payment session to obtain payments for one or more attendees of a subsequent event, wherein: (i) the event organizer and the one or more attendees are users of the social network platform, (ii) the one or more attendees are contacts of the event organizer in the social network platform, and (iii) the event-setup request includes an event time and a location of the subsequent event;
      in response to receiving the event set-up request:
         setting up the event-based payment session in accordance with the event-setup request; and
         providing, via a message using the social network platform, a payment invitation corresponding to the event-based payment session to each of one or more invitees of the subsequent event in accordance with the event-setup request, wherein the payment invitation includes a plurality of payment options;
      receiving from at least a first invitee of the one or more invitees, (i) a selection of one of the plurality of payment options and (ii) a conditional acceptance to the payment invitation, the conditional acceptance being conditioned on detecting that a first device associated with the first invitee and a second device associated with a second invitee of the one or more invitees, distinct from the first invitee, are both present at an event location of the subsequent event for at least a predefined duration of time during an event time of the subsequent event and the first device is within a predefined distance from the second device for at least one certain point in time during the predefined duration of time;
      determining that (i) the first device and the second device are both present at the event location of the subsequent event, and (ii) the first device and the second device both stay at the event location for at least the predefined duration of time during the event time of the subsequent event and the first device is within the predefined distance from the second device for the at least one certain point in time during the predefined duration of time; and
      in accordance with the determining that (i) the first device and the second device are both present at the event location of the subsequent event, and (ii) the first device and the second device both stay at the event location for at least the predefined duration of time during the event time of the subsequent event and the first device is within the predefined distance from the second device for the at least one certain point in time during the predefined duration of time, authorizing payment from a payment account associated with the first invitee to the organizer according to the selected payment option.

8. The server of claim 7, wherein the event-setup request comprises an event invitation message composed by the event organizer and addressed to one or more social network contacts of the event organizer, and wherein the payment invitation comprises the event invitation message.

9. The server of claim 7, wherein the conditional acceptance to the payment invitation is further conditioned on detecting at least a predefined number of attendees at the subsequent event, and the method further comprises:
   determining that respective devices associated with the at least a predefined number of attendees is at the event location of the subsequent event for at least the predefined duration of time during the event time of the subsequent event; and
   in accordance with the determining that the respective devices associated with the at least the predefined number of attendees is at the event location of the subsequent event for at least the predefined duration of time during the event time of the subsequent event, authorizing payment from the payment account associated with the first invitee to the organizer.

10. The server of claim 7, wherein providing a payment invitation to each of the one or more invitees comprises:
    electing to invite the first invitee based on membership of the first invitee in a social networking group of the social network platform.

11. The server of claim 7, wherein the operations further comprise:
    detecting forwarding of the payment invitation from an invitee of the one or more invitees to a sponsor of the invitee; and receiving from a device associated with the sponsor, confirmation to make a payment corresponding to the payment invitation on behalf of the invitee.

12. The server of claim 7, wherein the operations further comprise:
   receiving from a respective invitee of the one or more invitees, a rejection of the payment invitation;
   determining that (i) a device associated with the respective invitee is present at the event location of the subsequent event, and (ii) the device stays at the event location for at least the predefined duration of time during the event time of the subsequent event; and
   in accordance with the determining, reporting the presence of the respective invitee to the event organizer.

13. A non-transitory computer readable storage medium storing one or more programs, the one or more programs comprising instructions, which when executed by a social network platform server, cause the server to:
   receive an event-setup request from an event organizer to set up an event-based payment session to obtain payments for one or more attendees of a subsequent event, wherein: (i) the event organizer and the one or more attendees are users of the social network platform, (ii) the one or more attendees are contacts of the event organizer in the social network platform, and (iii) the event-setup request includes an event time and a location of the subsequent event;
   in response to receiving the event set-up request:
      set up the event-based payment session in accordance with the event-setup request; and
      provide, via a message using the social network platform, a payment invitation corresponding to the event-based payment session to each of one or more invitees of the subsequent event in accordance with the event-setup request, wherein the payment invitation includes a plurality of payment options;
   receive from at least a first invitee of the one or more invitees, (i) a selection of one of the plurality of payment options and (ii) a conditional acceptance to the payment invitation, the conditional acceptance being conditioned on detecting that a first device associated with the first invitee and a second device associated with a second invitee of the one or more invitees, distinct from the first invitee, are both present at an event location of the subsequent event for at least a predefined duration of time during an event time of the subsequent event and the first device is within a predefined distance from the second device for at least one certain point in time during the predefined duration of time;
   determine that (i) the first device and the second device are both present at the event location of the subsequent event, and (ii) the first device and the second device both stay at the event location for at least the predefined duration of time during the event time of the subsequent event and the first device is within the predefined distance from the second device for the at least one certain point in time during the predefined duration of time; and
   in accordance with the determination that (i) the first device and the second device are both present at the event location of the subsequent event, and (ii) the first device and the second device both stay at the event location for at least the predefined duration of time during the event time of the subsequent event and the first device is within the predefined distance from the second device for the at least one certain point in time during the predefined duration of time, authorize payment from a payment account associated with the first invitee to the organizer according to the selected payment option.

14. The non-transitory computer readable storage medium of claim 13, wherein the conditional acceptance to the payment invitation is conditioned on detecting at least a predefined number of attendees at the subsequent event, and further comprising instructions that cause the server to:
   determine that respective devices associated with the at least a predefined number of attendees is at the event location of the subsequent event for at least the predefined duration of time during the event time of the subsequent event; and
   in accordance with the determination that the respective devices associated with the at least the predefined number of attendees is at the event location of the subsequent event for at least the predefined duration of time during the event time of the subsequent event, authorize payment from the payment account associated with the first invitee to the organizer.

* * * * *